United States Patent [19]
Miyazaki et al.

[11] Patent Number: 5,547,291
[45] Date of Patent: Aug. 20, 1996

[54] PRELOADED ROLLING BEARING UNITS

[75] Inventors: Seizo Miyazaki, Kawasaki; Shiro Saito; Daijiro Kitahara, both of Tokyo, all of Japan

[73] Assignee: NSK, Ltd., Tokyo, Japan

[21] Appl. No.: 313,804

[22] Filed: Sep. 28, 1994

[30] Foreign Application Priority Data

Sep. 29, 1993 [JP] Japan ................................. 5-243239
Oct. 15, 1993 [JP] Japan ................................. 5-258608
Dec. 17, 1993 [JP] Japan ................................. 5-318362
Dec. 17, 1993 [JP] Japan ................................. 5-318363

[51] Int. Cl.$^6$ ................................................. F16C 19/08
[52] U.S. Cl. ........................... 384/512; 384/513; 384/517
[58] Field of Search ...................... 384/512, 517, 384/513, 501, 519, 506

[56] References Cited

U.S. PATENT DOCUMENTS 4,713,704  12/1987  Voll et al. .
4,900,958  2/1990   Kitahara et al. .
5,045,738  9/1991   Hishida et al. .
5,138,209  8/1992   Chuta et al. .
5,341,569  8/1994   Takamizawa et al. .

FOREIGN PATENT DOCUMENTS 50-101753  8/1975   Japan .
56-127456  9/1981   Japan .
57-140912  8/1982   Japan .
57-200722  12/1982  Japan .
60-196024  12/1985  Japan .
61-79899   4/1986   Japan .
61-65913   4/1986   Japan .
61-065913  4/1986   Japan .
61-079899  4/1986   Japan .
61-145761  7/1986   Japan .
62-22323   2/1987   Japan .
3-36517    4/1991   Japan .
3-222661   10/1991  Japan .
2199090    6/1988   United Kingdom .

*Primary Examiner*—Lenard A. Footland
*Attorney, Agent, or Firm*—Evenson, McKeown, Edwards & Lenahan

[57] ABSTRACT

A preloaded rolling bearing unit of the double row type has a pair of inner rings which have a raceway formed on a peripheral face at a location displaced in the axial direction from a central portion thereof, a first cylindrical portion axially protruding by a relatively large amount from one side of the raceway, and a second cylindrical portion axially protruding by a relatively small amount from the other side of the fourth raceway, whereby when the inner ring is engaged with an outer ring, the first cylindrical portion is positioned on an axially inner side of the bearing unit and the second cylindrical portion is positioned on an axially outer side of the bearing unit.

1 Claim, 26 Drawing Sheets

PRELOADED ROLLING BEARING UNITS

FIELD OF THE INVENTION

The present invention relates to rolling bearing units used for supporting the various precision rotating parts incorporated into components such as rotary actuators, rotary encoders, and spindle motors for video tape recorders (VTR), hard disk drives (HDD), and lazer beam printers (LBP).

DESCRIPTION OF THE RELATED ART

Ball bearings are used for rotatably supporting the spindles of VTRs and HDDs, while at the same time preventing whirling (movement in a direction perpendicular to the axis) and axial vibration. Conventionally a pair of ball bearings (deep groove or angular type) are used to be arranged separate to each other, or a double row ball bearing unit may be used to improve efficiency in fitting the ball bearing unit to the rotating support member.

Such a double row ball bearing unit comprises a shaft 2 as shown in FIG. 1(A), having a pair of inner raceways 1 of the deep groove type formed on an outer peripheral face thereof, and an outer ring 4 as shown in FIG. 1(B), having a pair of outer raceways 34 of the deep groove type formed on an inner peripheral face thereof, the shaft 2 and outer ring 4 being arranged concentric with each other as shown in FIG. 1(C), with a plurality of balls 5 fitted between the respective inner raceways 1 and the outer raceways 3 so as to be free to rotate therebetween. There are also a retainer or cage 6 (FIG. 1(C)) for retaining the balls 5 at an equidistant spacing in a circumferential direction, and a seal 7 for preventing the ingress of dust and the like into the region of the balls 5.

While the construction of the ball bearing unit of the double row deep groove type as shown in FIG. 1(C) is well known, it has heretofore been difficult to make such a bearing from supporting the spindle of a VTR or HDD. This is due to the following reasons.

Ball bearings for supporting the spindle of a VTR or an HDD must be of extremely high accuracy in order to prevent whirling movement and axial vibration. Consequently, such ball bearings for supporting the spindle are used in an axially preloaded condition.

In assembling the ball bearing of the deep groove type, fitting of the balls 5 between the inner raceways 1 and the outer raceways 3 involves making the inner raceways 1 off center to the outer raceways 3 as shown in FIG. 2, so that a circumferential space 8 between the two raceways 1, 3 has a widened portion whereby a predetermined number of balls 5 can be inserted between the inner raceways 1 and outer raceways 3. Subsequently the inner raceways 1 and outer raceways 3 are made concentric, and the predetermined number of balls 5 positioned with an equidistant spacing in a circumferential direction.

When the plurality of balls 5 which have been inserted together at the one location are positioned at an equidistant spacing in the circumferential direction, each of the balls 5 must be slid along the inner raceway 1 and the outer raceway 3. In carrying out this operation, since the inner raceway 1, and the outer raceway 3 are pressed hard against the balls 5 in a preloaded condition, there is a likelihood of scratching the surfaces of the inner raceway 1 and outer raceway 3 and the rolling faces of the balls 5. If scratching does occur, this can cause vibration and/or a reduction in durability.

On the other hand, with the construction disclosed for example in Japanese Patent First Publication KOKAI No. 57-200722 wherein a pair of ball bearings of the single row deep groove type are spaced apart from each other, since the pair of ball bearings are assembled unloaded, the above problems do not arise. However assembly of the ball bearings becomes difficult.

Moreover, with the ball bearing units of the double row deep groove type for tension pulleys, or water pumps, disclosed for example in Japanese Patent First Publication KOKAI Nos. 61-65918, 61-79899, and Japanese Utility Model First Publication KOKAI Nos. 50-101753, 56-127456, high rotational accuracy is not required for these applications, and these bearings are all used in the unloaded condition, and therefore not suitable for supporting the spindles of VTRs, HDDs and the like.

Japanese Patent First Publication KOKAI No. 61-145761 discloses a ball bearing unit of the double row angular type while Japanese Utility Model First Publication KOKAI No. 62-22323 discloses a double row ball bearing unit having a deep groove type ball bearing and an angular type ball bearing assembled together. When assembling the angular type ball bearing it is necessary, as disclosed in Japanese Examined Utility Model Publication KOKOKU No. 39-3916, to expand the outer ring by heating to ensure that the shoulder portion of the raceway surface and the rolling surfaces of the balls are not scratched when the balls are passed through the shoulder portion of the raceway surface. Hence the assembly procedure becomes complicated.

Japanese Patent First Publication KOKOKU No. 57-140912 discloses a ball bearing unit of the double row deep groove type having an outer ring assembly of a main outer ring and sub outer ring which is movable axially with respect to the main outer ring, the outer ring being assembled unloaded and then subjected to a predetermined preloading by axially moving the sub outer ring. Also disclosed is an invention for fixing the sub outer ring with a restraining member, and an invention for applying a predetermined preload by axially pressing the sub outer ring with a spring. The inventions disclosed in the publication require either a restraining member or a spring, so that as well as complicating parts management and assembly operations, the axial length of the ball bearing must be made longer than necessary.

U.S. Pat. No. 4,900,958 discloses constructions such as shown in FIG. 3 and FIG. 4. With the construction of FIG. 3, a pair of ball bearings 9 of the deep groove type (or angular type) are provided between an outer peripheral face of the shaft 2 and inner peripheral faces of the housing 10, and the balls 5 of both ball bearings 9 are preloaded by pressing the inner rings 11 of the ball bearings 9 towards each other. That is to say, the end face of one inner ring 11 (right side in FIG. 3) is abutted against a stop ring 12 and the preload applied by pressing the other inner ring 11 (left side in FIG. 3) towards the stop ring 12. Specifically, until this inner ring 11 is fixed to the shaft 2 by solidification of adhesive or by shrink fitting of the heated inner ring 11, it continues to apply a load corresponding to the preload in the direction of the stop ring 12.

Moreover, with the construction of FIG. 4, a double row of inner raceways 1 is formed on the outer peripheral surface of the shaft 2, and a spacer 13 is inserted between a pair of outer rings 4 which are internally fitted into the housing 10 to thereby urge the outer rings 4 spaced apart to apply a preload to the balls 5.

Japanese Utility Model First Publication KOKAI No. 3-36517 discloses a construction as shown in FIG. 5, wherein a preload is applied to the balls 5 by means of a plate spring 14 sandwiched between the pair of outer raceways 4 so as to urge both outer rings 4 spaced apart.

Japanese Patent First Publication KOKAI No. 3-222661 and U.S. Pat. No. 5,045,738 disclose constructions as shown in FIG. 6 and FIG. 7.

With the construction of FIG. 6, an outer ring 4 is fitted inside a housing 10, and a preload is applied by a plate spring 14 which presses against the outer ring 4.

With the construction of FIG. 7, one of two outer raceways 3 is formed on an inner peripheral face of an outer ring 4, while the other outer raceway 3 is formed on an inner peripheral face of a housing 10, the outer ring 4 being fixed to the housing 10 under a predetermined preload using an adhesive or by shrink fitting.

Moreover, although figures are omitted, Japanese Patent First Publication KOKAI No. 61-145761 and U.S. Pat. No. 4,713,704 disclose constructions wherein one of two inner raceways is formed on an outer peripheral face of a shaft, while the other inner raceway is formed on an outer peripheral face of an inner ring which is fitted onto the shaft, the inner ring being fixedly adhere to the shaft with an appropriate preload applied to the balls.

With the constructions shown in FIG. 3 through FIG. 7 and those disclosed in Japanese Patent First Publication KOKAI No. 61-145761, in addition to the stated problems of complicated assembly and parts management requirements, there is also the possibility of slight vibrations. That is to say, since with all of the conventional constructions, at the time of applying a preload, either the inner ring 11 is loosely engaged on the shaft 2 (in the construction of FIG. 3), or the outer ring 4 is loosely engaged in the housing 10 (in the constructions of FIG. 4 through FIG. 7), there is the possibility of the inner ring 11 or the outer ring 4 being, although slightly, tilted during the preload operation. This can lead to slight vibrations during rotation of the resultant bearing unit, marring the performance of devices such as HDDs into which the bearing unit is assembled.

To address the above problems, the present inventors have developed, as disclosed in Japanese Patent First Publication KOKAI No. 6-221326 (a U.S. Pat. No. 5,341,569), preloaded rolling bearing units such as those shown in FIG. 8(A) to FIG. 12(B).

A first example of the preloaded rolling bearing units is constructed according to the steps illustrated by FIG. 8(A) to FIG. 8(D). With this example, a shaft (first member) 15 as shown in FIG. 8(A) is formed with a smaller diameter portion 15a and a larger diameter portion 15b connected together by a step portion 15c, and a deep groove type first inner raceway (first raceway) 16 on an outer peripheral face of the larger diameter portion (first peripheral face) 15b. An inner ring (third member) 17 which has an inner diameter slightly smaller than the outer diameter of the smaller diameter portion 15a in an unfitted or free condition, is formed with a deep groove type second inner raceway (fourth raceway) 18 on an outer peripheral face thereof.

When assembling such a rolling bearing unit incorporating the shaft 15 and the inner ring 17, initially, in a first step the inner ring 17 is press fitted onto the small diameter portion 5a of the shaft 15 as shown in FIG. 8(B), so as to give sufficient engaging or fitting strength (sufficient strength to ensure no slipping movement under the preload reaction force). A pitch P1 of the first inner raceway 16 on the outer peripheral face of the larger diameter portion 15b and the second inner raceway 18 on the outer peripheral face of the inner ring 17 is made larger than a pitch p1 (FIG. 8(D)) required for applying the predetermined preload to the rolling bearing unit after assembly (P1>p1).

Next, in a second step, the shaft 15 and the inner ring 17 assembled in the first step, are inserted inside a cylindrical outer ring (second member) 19, which is formed with a pair of deep groove type outer raceways (second and third raceways) 25 on an inner peripheral face (second peripheral face) thereof. In the second step, the first and second inner raceways 16, 18 are respectively positioned opposite to the two outer raceways 25.

Then, in a third step, the outer ring 19 is positioned off center to the shaft 15 and inner ring 17, so that the circumferential space 8 (see FIG. 2) between the pair of outer raceways 25 and the first and second inner raceways 16, 18 has a widened portion. A predetermined number of balls 5 are then inserted into the circumferential space 8 from the widened portion.

Subsequently, in a fourth step, the predetermined number of balls 5 inserted into the circumferential space 8 between the pair of outer raceways 25 and the first and second inner raceways 16, 18 are moved in a circumferential direction with the shaft 15 and inner ring 17 concentric with the outer ring 19, and are positioned with an equidistant spacing in the circumferential direction. In conjunction with this, a retainer or cage 6 as shown in FIG. 8(C), is fitted to each row of balls so as to retain the balls 5 at the equidistant spacing in the circumferential direction. As required, seals 7 are fitted to the inner peripheral faces of the outer ring 19 at both axially outer ends thereof. In this condition, the respective balls 5 have not yet been subjected to preloading.

Finally, in a fifth step, the pitch of the first and second inner raceways 16, 18 is reduced by displacing the inner ring 17 in an axial direction over the outer peripheral face of the shaft 15 towards the step 15c (to the left in FIG. 8(D)), to give the necessary pitch p1 for the predetermined preload. In this condition, the predetermined preload is applied to the plurality of balls 5, thus completing construction of the preloaded rolling bearing unit. When finished there is still a gap between the step 15c and the end face of the inner ring 17.

With the preloaded rolling bearing unit assembled in this way, a restraining force due to the interference engagement friction force, which is larger than the axial load corresponding to the preload, acts between the inner peripheral face of the inner ring 17 and the outer peripheral face of the smaller diameter portion 15a. Accordingly, even without adhesive between the shaft 15 and the inner ring 17, the inner ring 17 is unable to move, thus maintaining the preload so the bearing can be treated as a unitary ball bearing. Consequently the construction of bearings for a VTR or HDD spindle is simplified. Moreover, the axially applied preload enables highly accurate rotational support of the spindle to be achieved.

The inner ring 17 can however be moved with reference to the smaller diameter portion 15a by applying an axial force which is greater than the restraining force due to the interference engagement of the inner ring 17. Therefore the preload given to the rolling bearing unit can be later adjusted (increased or reduced) if a force suitably greater than the loading is applied to the inner ring 17, so that the inner ring 17 is moved in an axial direction.

In the case of a second example shown in FIG. 9(A) to FIG. 9(E), first and second inner raceways 16a, 18a are respectively formed on the outer peripheral face of the shaft 15 and the outer peripheral face of the inner ring 17a after press fitting the inner ring 17a onto the smaller diameter portion 15a as in FIG. 9(B) and FIG. 9(C). Adopting this construction avoids any non cylindrical distortion which would occur in the inner raceway 18 (FIGS. 8(A) to 8(D)) due to press fitting the inner ring 17a onto the small diameter portion 15a.

In the case of a third example shown in FIG. 10(A) to FIG. 10(E), a main outer ring (first member) 20 as shown in FIG. 10(A) is formed with a smaller diameter portion 20a and a larger diameter portion 20b on an inner peripheral face thereof connected together by a step portion 20c. A sub outer ring (third member) 21 is adjustably fitted inside the larger diameter portion 20b. The inner peripheral face of the sub outer ring (third peripheral face) 21 and the inner peripheral face of the small diameter portion (first peripheral face) 20a are respectively formed generally around their periphery with grooves 22a, 22b having an arcuate shape in cross section. The sub outer ring 21 has an outer diameter slightly larger than the inner diameter of the larger diameter portion 20b in the unfitted or free condition.

When assembling the preloaded rolling bearing unit using the main outer ring 20 and the sub outer ring 21, initially in a first step as shown in FIG. 10(B), the sub outer ring 21 is inserted into the larger diameter portion 20b so as to be retained therein with sufficient engaging or fitting strength. Then as shown in FIG. 10(C), a first outer raceway (first raceway) 23 and a second outer raceway (fourth raceway) 24 are formed in the grooves 22a, 22b.

By forming the first and second outer raceways 23, 24 in this way with the main outer ring 20 and sub outer ring 21 assembled together, the roundness of both outer raceways 23, 24 can be made to a high accuracy. Moreover, any eccentricity between both outer raceways 23, 24 and the outer peripheral face of the main outer ring 20 can be kept very small. A pitch P2 of the first and second outer raceways 23, 24 formed in FIG. 10(C) is made larger than a pitch p2 in FIG. 10(E) required for applying the predetermined preload (P2>p2).

Next, in a second step, a shaft 2 (see FIG. 10(D)) formed with a pair of inner raceways (second and third raceways) 1 on an outer peripheral face (second peripheral face) thereof, is inserted inside the main outer ring 20 and sub outer ring 21 assembled by the first step, with the pair of inner raceways 1 respectively positioned opposite to the first and second outer raceways 23, 24.

Then, in a third step, the main outer ring 20 and sub outer ring 21 are positioned off center to the shaft 2 as shown in FIG. 2. The predetermined number of balls 5 are then inserted into the circumferential space 8 between the pair of inner raceways 1 and the first and second outer raceways 23, 24.

Subsequently, in a fourth step as shown in FIG. 10(D), the shaft 2 is made concentric with the main outer ring 20 and sub outer ring 21, and the predetermined number of balls 5 inserted between the pair of inner raceways 1 and the first and second outer raceways 23, 24 are positioned with an equidistant spacing in a circumferential direction. Also in the fourth step, retainers or cages 6 are fitted to the equidistant spaced balls 5.

Finally, in a fifth step, the pitch of the first and second outer raceways 23, 24 as shown in FIG. 10(E) is reduced by displacing the sub outer ring 21 in an axial direction over the inner peripheral face of the main outer ring 20 (to the left in FIG. 10(E)), to give the necessary pitch p2 for the predetermined preload. In this condition, the predetermined preload is applied to the plurality of balls 5. Seals 7, 7a are then fitted, thus completing construction of the rolling bearing unit.

With the constructions wherein the preload can be adjusted by changing the pitch of the first and second outer raceways, then as with a fourth example shown in FIGS. 11(A) and 11(B), it is also possible to internally fit a pair of sub outer rings 21, 21a into a main outer ring 20A having no outer raceways. With the construction of FIGS. 11(A) and 11(B), inner raceways (second and third raceways) 1 are formed on an outer peripheral face of an inner ring (second member) 17c.

Similarly, with a construction wherein the preload can be adjusted by changing the pitch of the first and second inner raceways, then as with a fifth example shown in FIG. 12(A) and 12b), it is also possible to externally fit a pair of inner rings 17, 17b onto the shaft 2. Respective first and second inner raceways 16b, 18b are formed on the outer peripheral faces of the inner rings 17, 17b.

Even with the rolling bearing units of the previous inventions constructed and operating as described above, there are still the following points to be resolved.

That is to say, in the cases where the inner rings 17, 17a, 17b are press fitted onto the shafts 2 or 15, or the sub outer rings 21, 21a are press fitted into the respective main outer rings 20, 20A, in order to apply an appropriate preload to the double row of balls 5 it is essential that the inner rings 17, 17a, 17b or the sub outer rings 21, 21a are securely fixed to their mating members, that is, shafts 2, 15 or the main outer rings 20, 20A. Hence to guarantee the engaging or fitting strength between the respective member pairs there must be a sufficient frictional force acting over the engagement faces.

Methods for increasing the frictional force at the engagement portions involve; (1) increasing the contact pressure on the engagement portions, or (2) increasing the area of contact between the engagement portions.

If method (1) is adopted, the fitting interference of the mutually engaging members must be made thicker. However simply increasing the amount of the fitting interference results in a larger tensile stress in the radially outer member so that this becomes susceptible to rupture failure. To avoid this, the radially outer member must therefore be made thicker, thereby increasing the external diameter of the preloaded rolling bearing unit. This is undesirable in the case of miniature rolling bearing units for assembly into HDDs etc.

In adopting method (2), the axial dimension of the inner rings 17, 17a, 17b or of the sub outer rings 21, 21a can be increased. However simply increasing the axial dimension of these members results in a larger bearing unit and/or a reduction in bearing rigidity.

That is to say, in the case of the preloaded rolling bearing units according to KOKAI No. 6-221326, inner or outer raceways are respectively formed on the axially central portions of the inner rings 17, 17a, 17b or the sub outer rings 21, 21a. Accordingly if a sufficient gap is to be maintained between the double row raceway pairs, the axial ends of the inner rings 17, 17a, 17b or of the sub outer rings 21, 21a, must protrude significantly in an axial direction. The axial dimension of the rolling bearing unit thus becomes undesirably large. On the other hand, if the spacing of the double row raceway pairs is reduced to prevent the protrusion of the axial ends, the anti-bending-moment rigidity of the rolling bearing unit is reduced, which is also undesirable.

SUMMARY OF THE INVENTION

It is an object of the present invention to provide a preloaded rolling bearing unit which addresses the above problems.

It is another object of the present invention to provide a preloaded rolling bearing unit which is compact with a high anti-bending-moment rigidity.

The preloaded rolling bearing unit of the present invention is comprised of; a first member having a first peripheral face, a second member located concentric with the first member with a second peripheral face opposite to the first peripheral face, a first raceway formed on the first peripheral face, a second raceway formed on a portion of the second peripheral face which is opposite to the first raceway, and a third raceway formed on a portion of the second peripheral face which is displaced in the axial direction from the second raceway, a third member supported on the first member with sufficient engaging or fitting strength, concentric with the first and second members and having a third peripheral face opposite to the second peripheral face, a fourth raceway formed on a portion of the third peripheral face which is opposite to the third raceway, and a plurality of balls provided respectively between the first and second raceways and between the third raceway and fourth raceways. An appropriate preload is applied to the plurality of balls by adjusting an engaging or fitting depth of the third member with respect to the first member.

Moreover, with the preloaded rolling bearing unit of the present invention, the fourth raceway is formed on the third peripheral face at a location displaced in the axial direction from a central portion thereof. This results in a first cylindrical portion on the third member axially protruding by a relatively large amount from one side of the fourth raceway, and a second cylindrical portion on the third member axially protruding by a relatively small amount from the other side of the fourth raceway. Furthermore, the arrangement is such that with the third member engaged with the first member, the first cylindrical portion is on an axially inner side of the bearing unit and the second cylindrical portion is on an axially outer side of the bearing unit.

With the preloaded rolling bearing unit of the present invention constructed as above, since the second cylindrical portion which protrudes by a relatively small amount, is on the axially outer side of the bearing unit, then even if the axial length of the third member is made larger to ensure adequate engaging or fitting strength between the third member and the first member, the spacing of the double row raceway pairs can be maintained without increasing the axial length of the rolling bearing unit. Hence, a compact rolling bearing unit of high anti-bending-moment rigidity is obtained.

Other objects and aspects of the present invention will become apparent from the following description of embodiments given in conjunction with the appended drawings.

BRIEF DESCRIPTION OF THE DRAWINGS

FIGS. 8(A) to 8(C) are partly cross sectional views showing the assembly steps of another example of a conventional preloaded rolling bearing unit; wherein FIG. 8(A) shows an exploded state of the shaft and inner ring, and FIG. 8(C) to FIG. 8(D) show an assembled state of the shaft and inner ring.

DESCRIPTION OF THE PREFERRED EMBODIMENTS

Figure 1A:
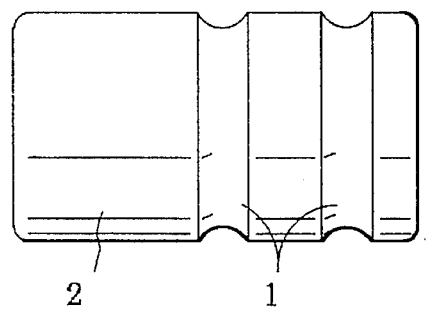
FIG. 1(A) is a side elevational view of a shaft to be assembled with an outer ring.
Figure 1B:
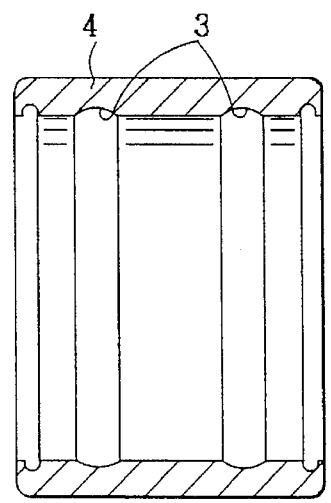
FIG. 1(B) is a cross sectional view showing an outer ring to be assembled with the shaft of FIG. 1(A).
Figure 1C:
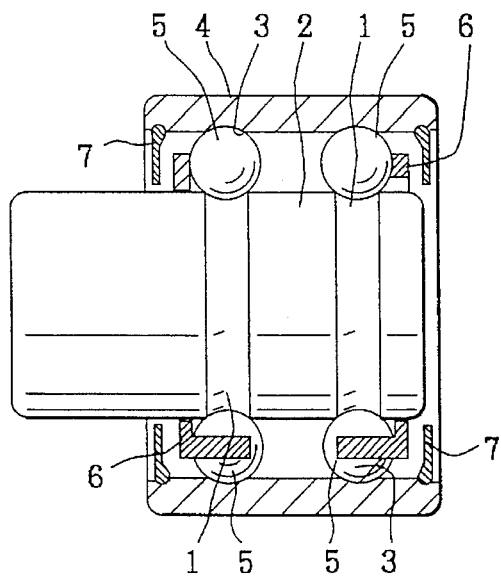
FIG. 1(C) is a cross sectional view of a conventional rolling bearing unit after assembling the shaft of FIG. 1(A) and the outer ring of FIG. 1(B)
Figure 2:
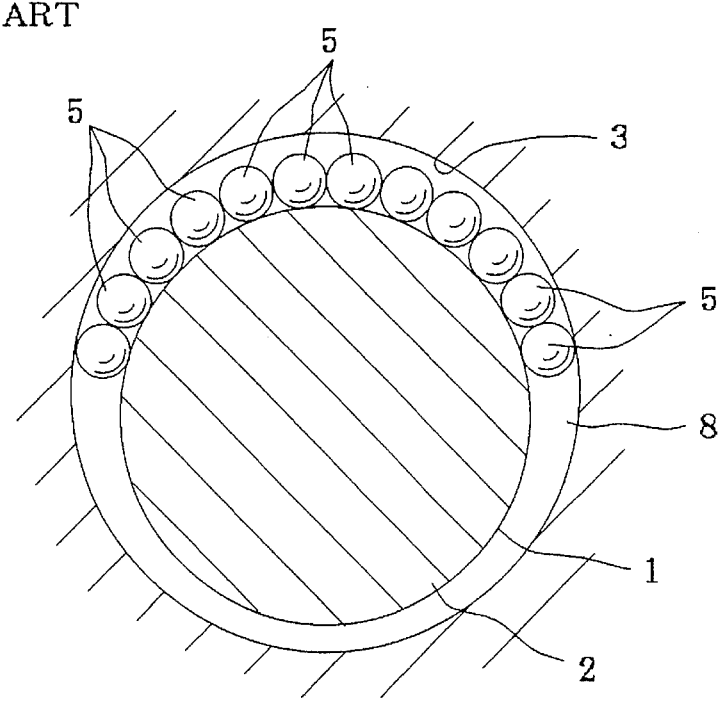
FIG. 2 shows an off center condition of an outer raceway relative to an inner raceway for insertion of the balls.
Figure 3:
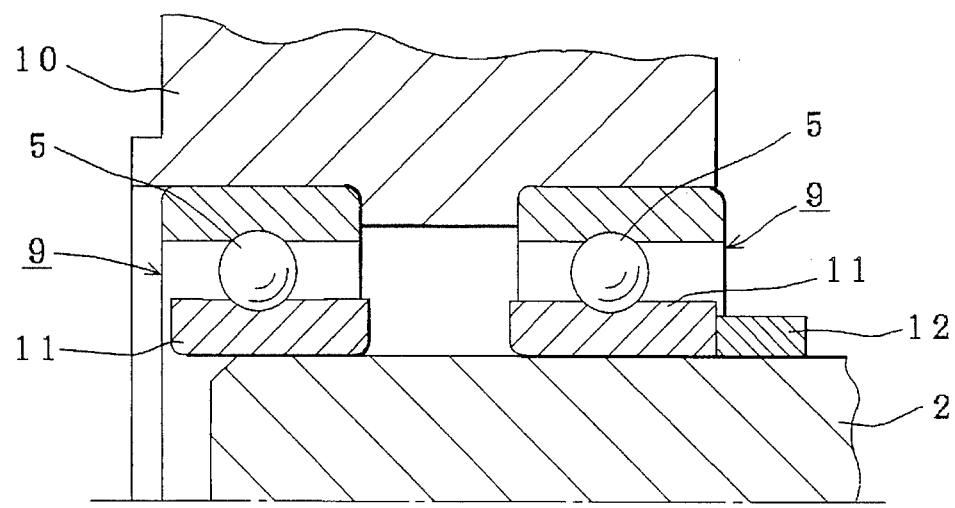
FIG. 3 is a partial sectional view illustrating a first example of a conventional bearing construction.
Figure 4:
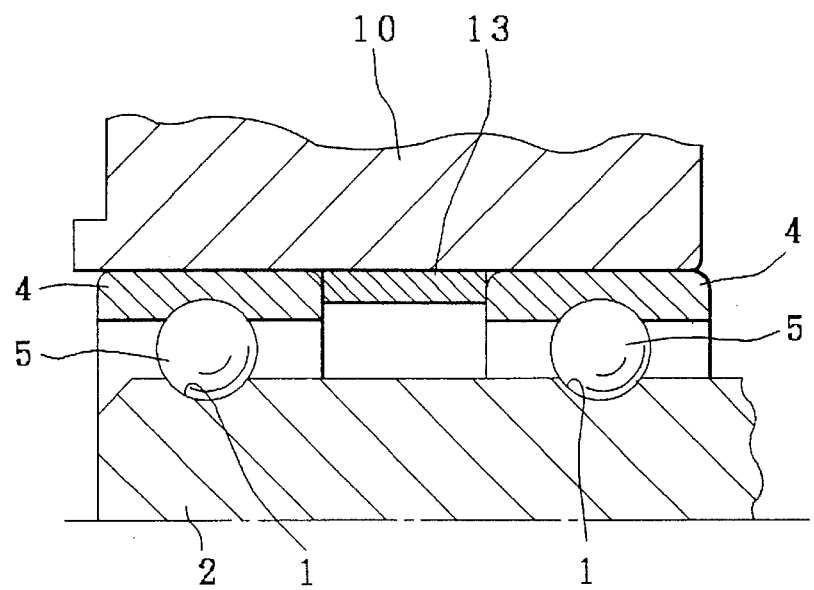
FIG. 4 is a partial sectional view illustrating a second example of a conventional bearing construction.
Figure 5:
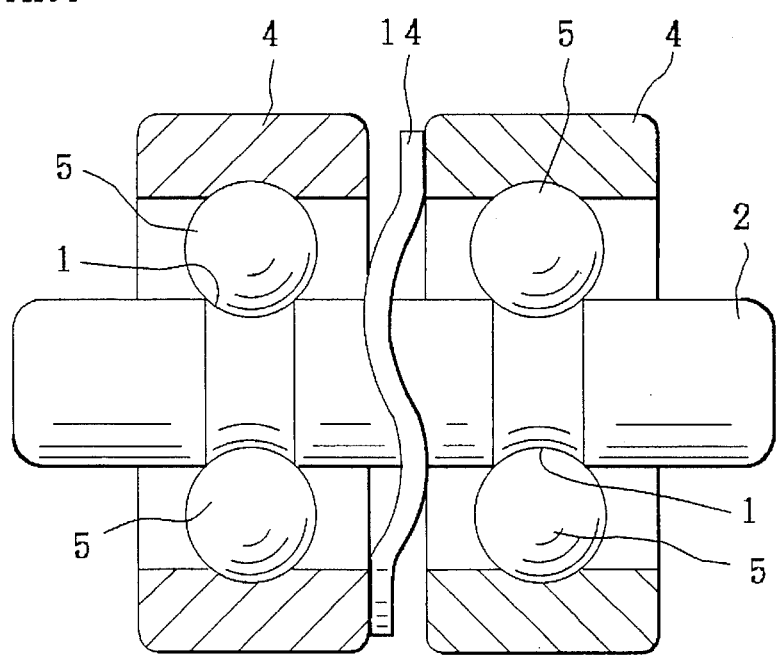
FIG. 5 is a sectional view illustrating a third example of a conventional bearing construction.
Figure 6:
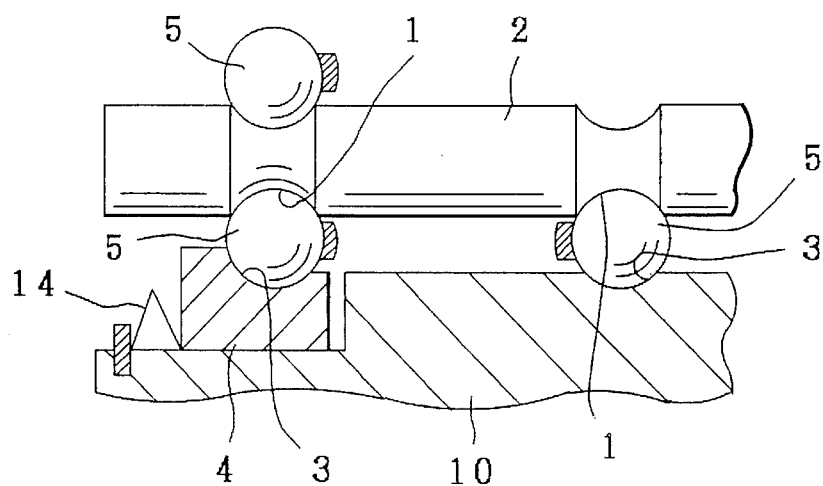
FIG. 6 is a partial sectional view illustrating a fourth example of a conventional bearing construction.
Figure 7:
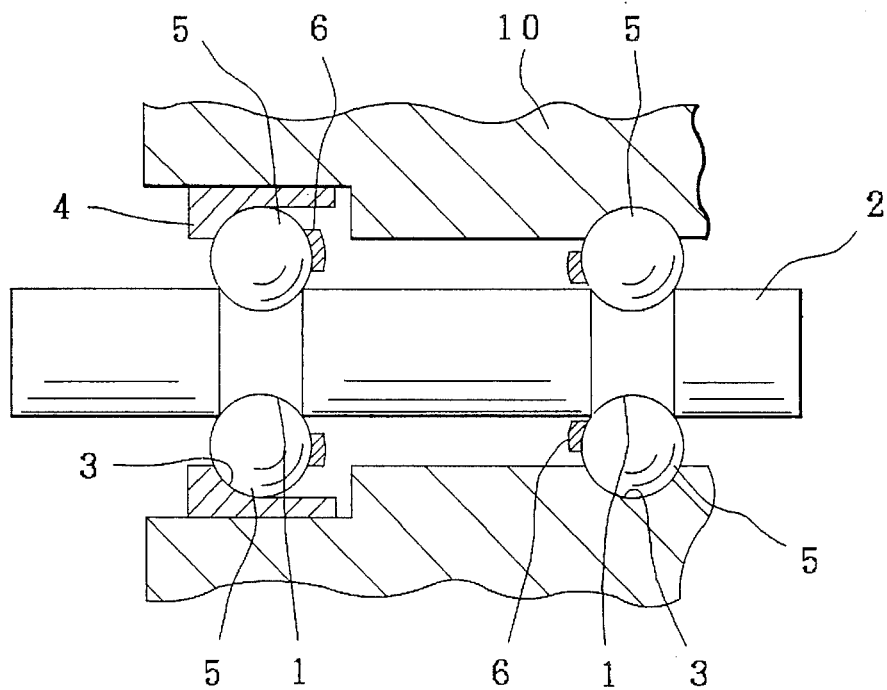
FIG. 7 is a partial sectional view illustrating a fifth example of a conventional bearing construction.
Figure 8A:
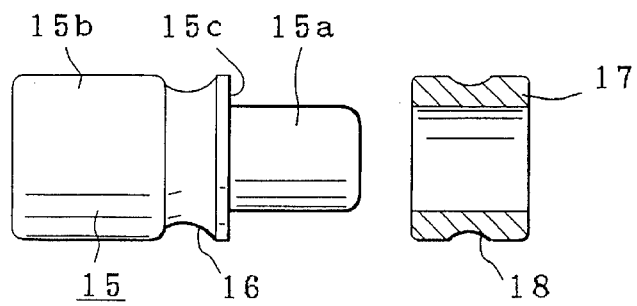
Figure 8B:
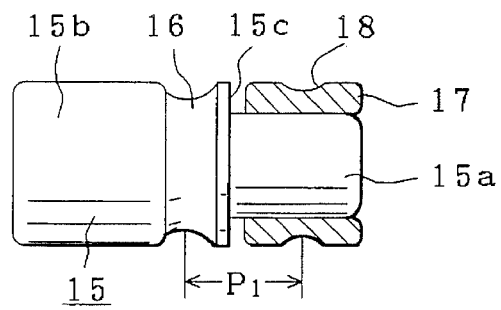
Figure 8C:
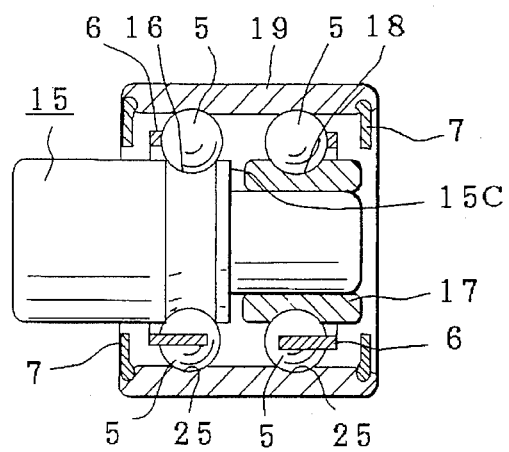
Figure 8D:
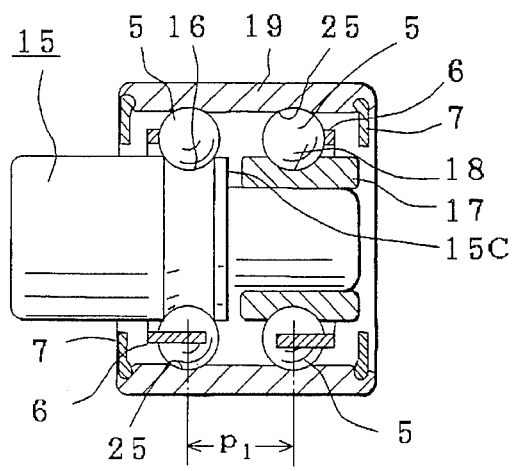
Figure 9A:
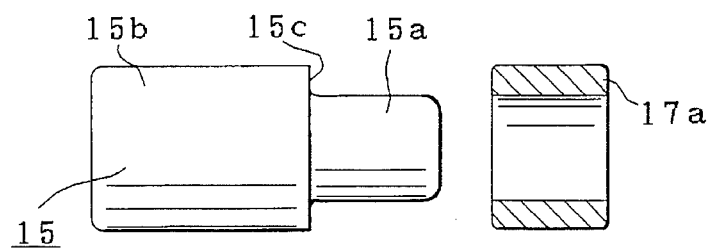
FIGS. 9(A) to 9(D) are sectional views showing the assembly steps of another example of a conventional preloaded rolling bearing unit of a previous invention.
Figure 9B:
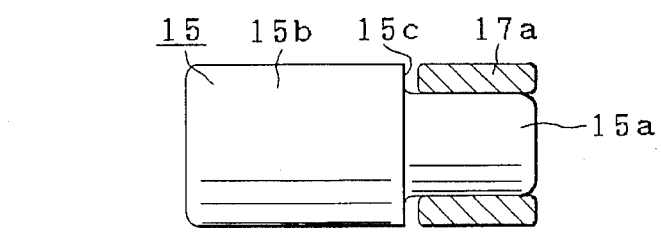
Figure 9C:
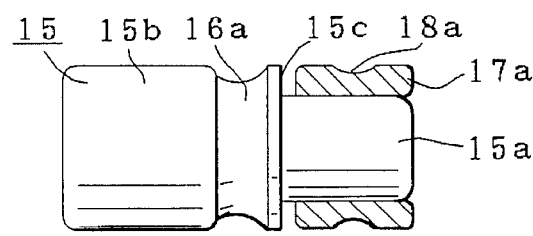
Figure 9D:
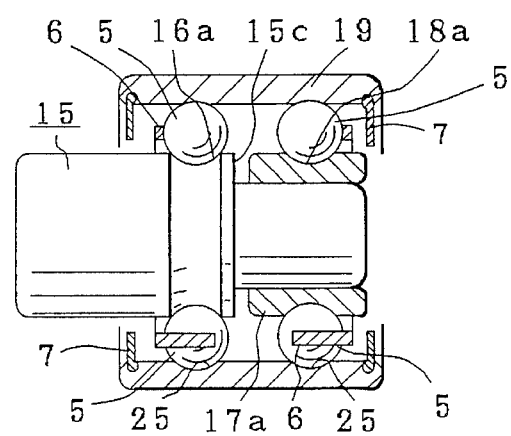
Figure 9E:
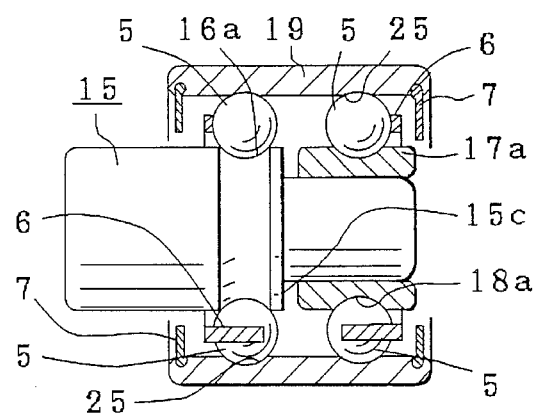
Figure 10A:
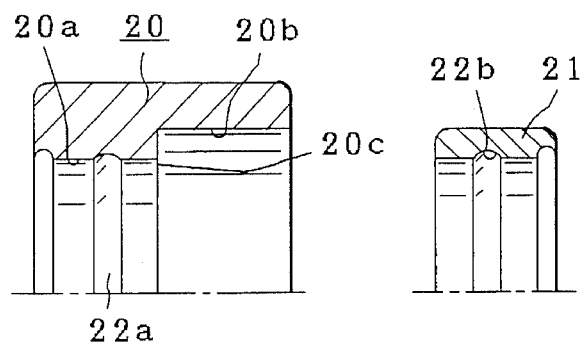
FIGS. 10(A) to 10(E) are sectional views showing the assembly steps of another example of a conventional preloaded rolling bearing unit of a previous invention.
Figure 10B:
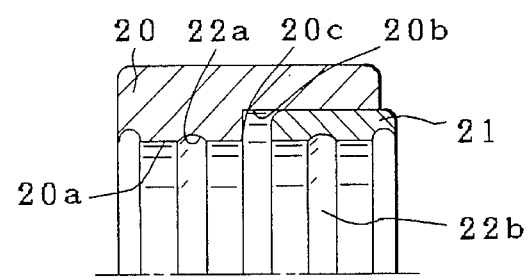
Figure 10C:
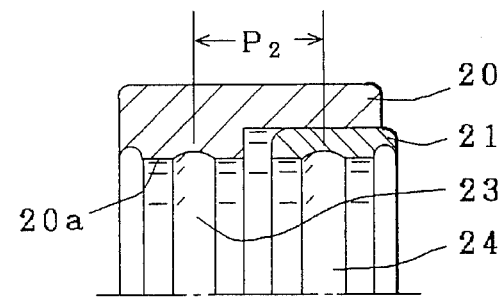
Figure 10D:
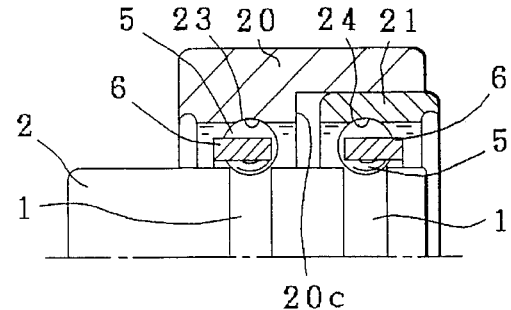
Figure 10E:
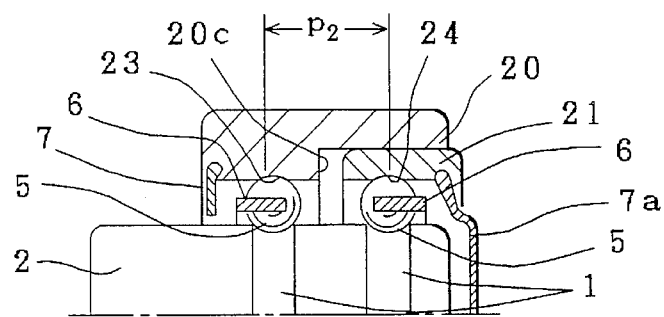
Figure 11:
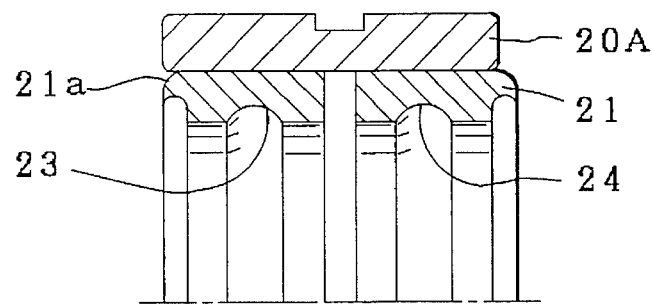
FIGS. 11(A) to 11(B) are sectional views showing the assembly steps of another example of a conventional preloaded rolling bearing unit of a previous invention.
Figure 11:
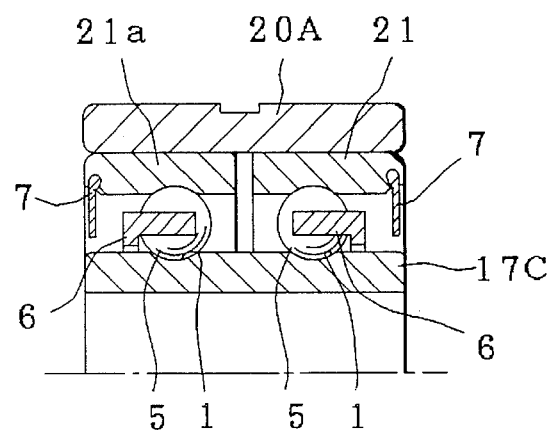
Figure 12:
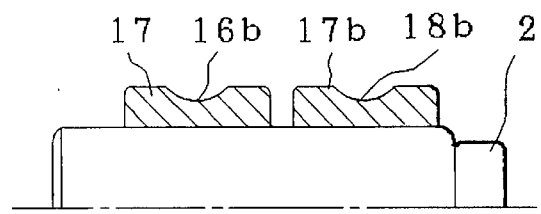
FIGS. 12(A) to 12(B) are sectional views showing assembly steps of another example of a conventional preloaded rolling bearing unit of a previous invention.
Figure 12:
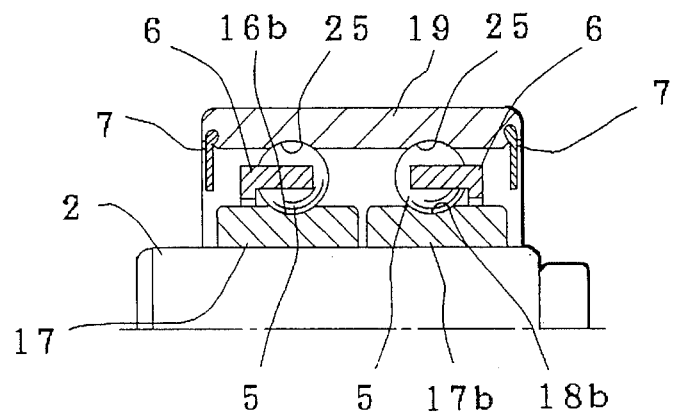
Figure 13:
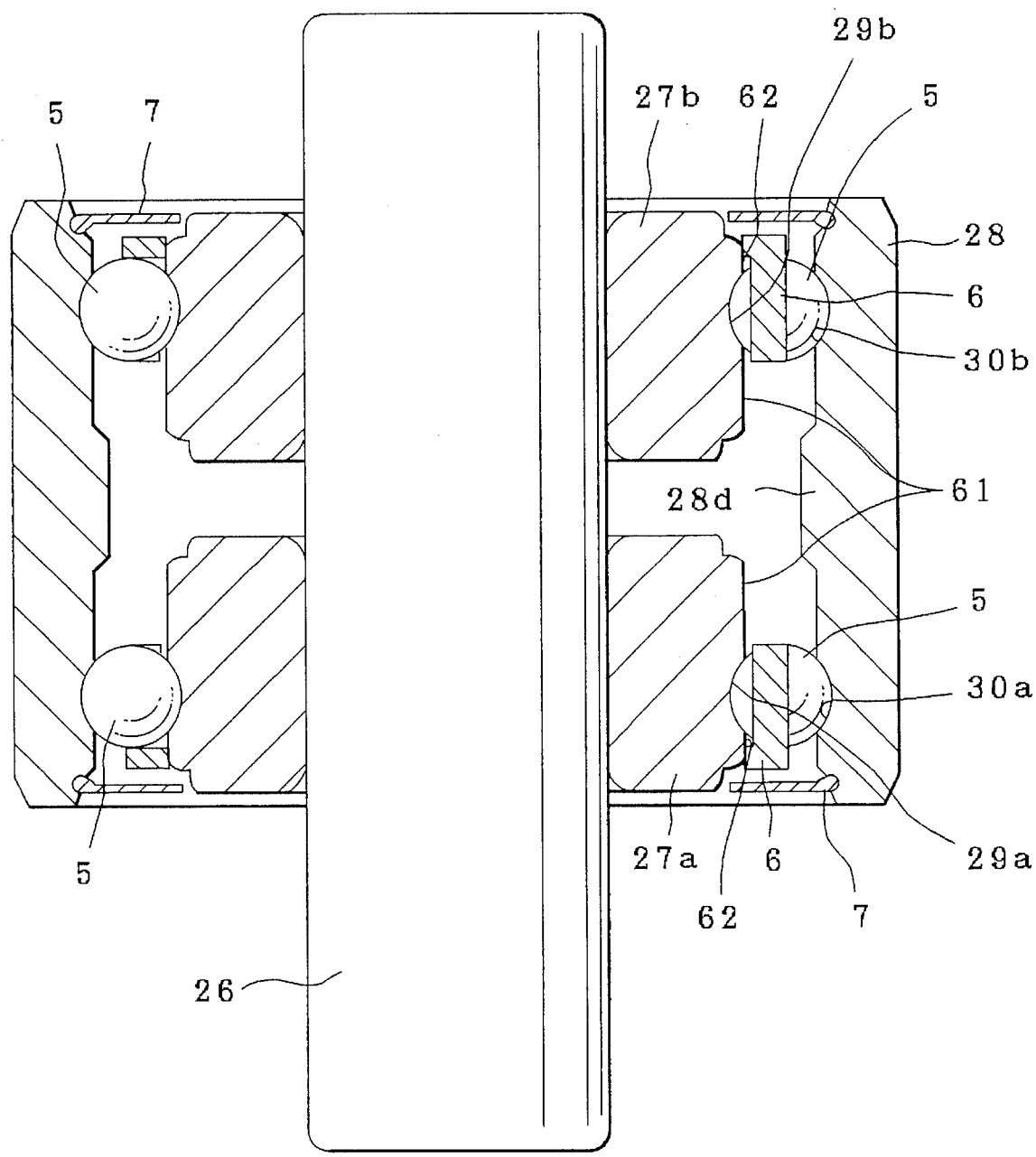
FIG. 13 is a sectional view of a first embodiment of the present invention in a completed condition.
Figure 14:
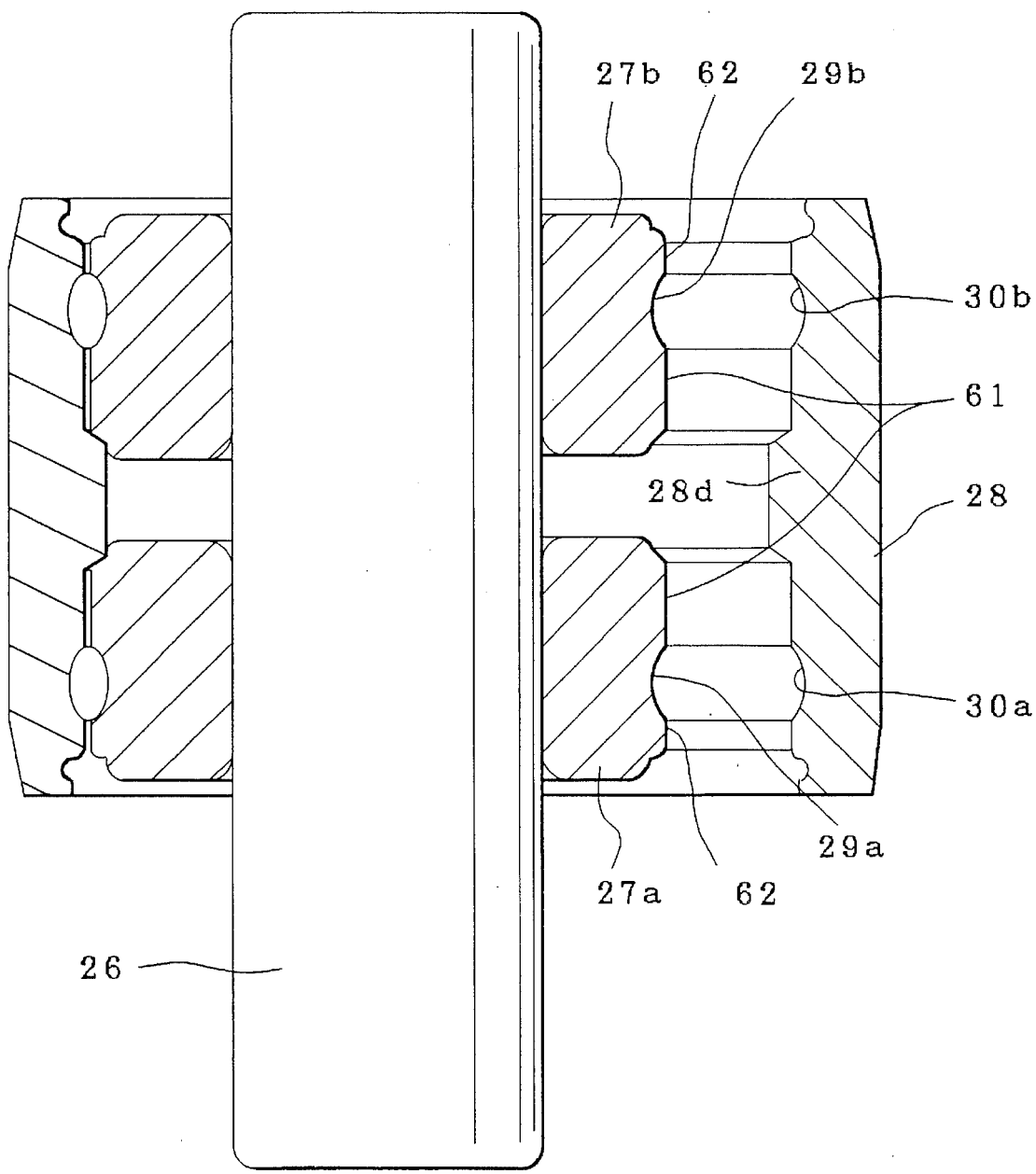
FIG. 14 is a sectional view of the first embodiment of the present invention in a semi completed condition.

FIGS. 13 and 14 illustrate a first embodiment of the present invention. With this embodiment the assembly steps are the same as for the beforementioned previous invention in KOKAI No. 6-221326 and redundant description is omitted. The following description is centered on the main features of the present invention which is applied to the construction of the example shown in FIGS. 12(A), 12(B).

As shown in FIGS. 13 and 14, a pair of inner rings 27a, 27b are press fitted onto a shaft 26. The shaft 26 and the inner rings 27a (lower ring in FIGS. 13 and 14) correspond to the first member, while the other inner ring 27b (upper ring in FIGS. 13 and 14) corresponds to the third member. An outer ring 28 is provided around the pair of inner rings 27a, 27b concentric therewith, and corresponds to the second member.

A first inner ring raceway (first raceway) 29a is formed on an outer peripheral face (first peripheral face) of one inner ring 27a while a second inner ring raceway (fourth raceway) 29b is formed on an outer peripheral face (third peripheral face) of the other inner ring 27b. Moreover respective first and second outer raceways (second and third raceways) 30a, 30b are formed on an inner peripheral face (second peripheral face) of the outer ring 28. The first and second outer raceways 30a, 30b are respectively opposed to the first and second inner raceways 29a, 29b.

A thickened portion 28d is formed on a central portion of the inner peripheral face of the outer ring 28 to enhance the strength of the outer ring 28.

The first and second inner raceways 29a, 29b are respectively formed on the outer peripheral faces of the inner rings 27a, 27b at locations which are displaced in the axial direction from central portions thereof. This results in a first cylindrical portion 61 on a portion of each of the inner rings 27a, 27b axially protruding by a relatively large amount from one side of each of the respective first and second inner raceways 29a, 29b, and a second cylindrical portion 62 on a portion of each of the inner rings 27a, 27b, axially protruding by a relatively small amount from the other side of each of the respective inner ring raceways 29a, 29b.

With the preloaded rolling bearing unit of the present invention, when press fitting the inner rings 27a, 27b onto the shaft 26, the first and second cylindrical portions 61, 62 are arranged so that the first cylindrical portions 61 are faced to each other, and the second cylindrical portions 62 are positioned on axially outer sides of the rolling bearing unit.

With the above construction for the preloaded rolling bearing unit of the present invention, since the second cylindrical portions 62 which protrude by a relatively small amount, are positioned on the axially outer sides of the rolling bearing unit, then even if the axial length (in the vertical direction in FIGS. 13, 14) of the inner rings 27a, 27b is made larger to ensure adequate engaging or fitting strength between the inner rings 27a, 27b and the shaft 26, the spacing between the double row raceway pairs specifically between the first and second inner raceways 29a, 29b and between the outer raceways 30a, 30b can be maintained without increasing the axial length of the rolling bearing unit. Hence, a compact rolling bearing unit of high anti-bending-moment rigidity is obtained.

When fitting the balls 5 to the preloaded rolling bearing unit of the present invention, the inner rings 27a, 27b are made off center to the outer ring 28 as shown in FIG. 14. The balls 5 are then inserted through the widened portion between the first and second inner raceways 29a, 29b and the first and second outer raceways 30a, 30b and thereby between the pair of raceways 29a, 29b and the pair of raceway 30a, 30b. At this time the spacing between the first and second inner raceways 29a, 29b is made a little larger than that required for the preload. Since the assembly method itself is substantially the same as for the previously mentioned KOKAI No. 6-221326, detailed description is omitted.

Figure 15:
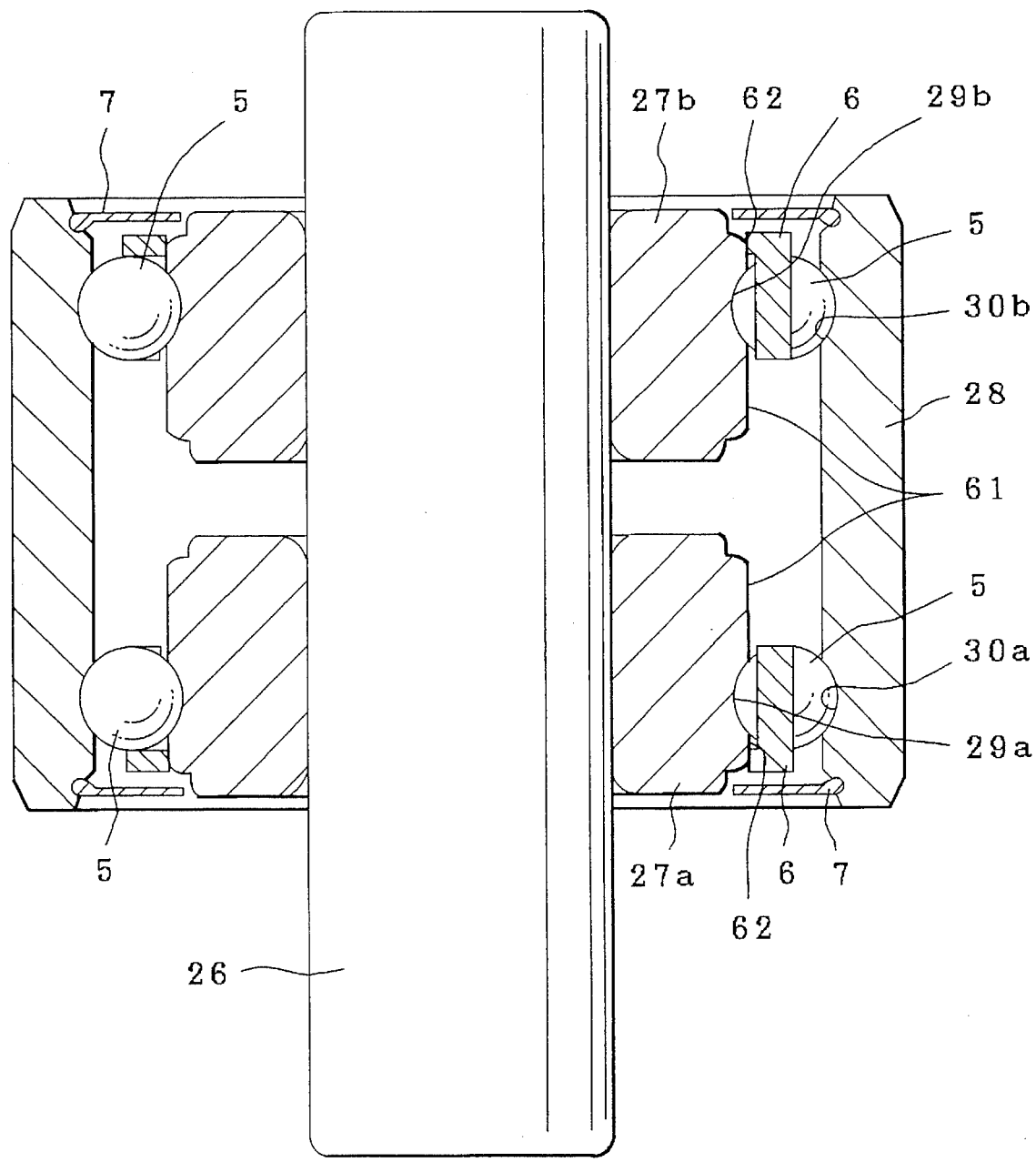
FIG. 15 is a sectional view of a second embodiment of the present invention.

A second embodiment according to the present invention is shown in FIG. 15. With this embodiment, the central portion of the inner peripheral face of the outer ring 28 is a plane cylindrical surface, without the thickened portion of the beforementioned first embodiment (see FIGS. 13, 14). Other details of construction and operation are similar to those of the first embodiment, hence similar parts are indicated with the same numerals and detailed description is omitted.

Figure 16:
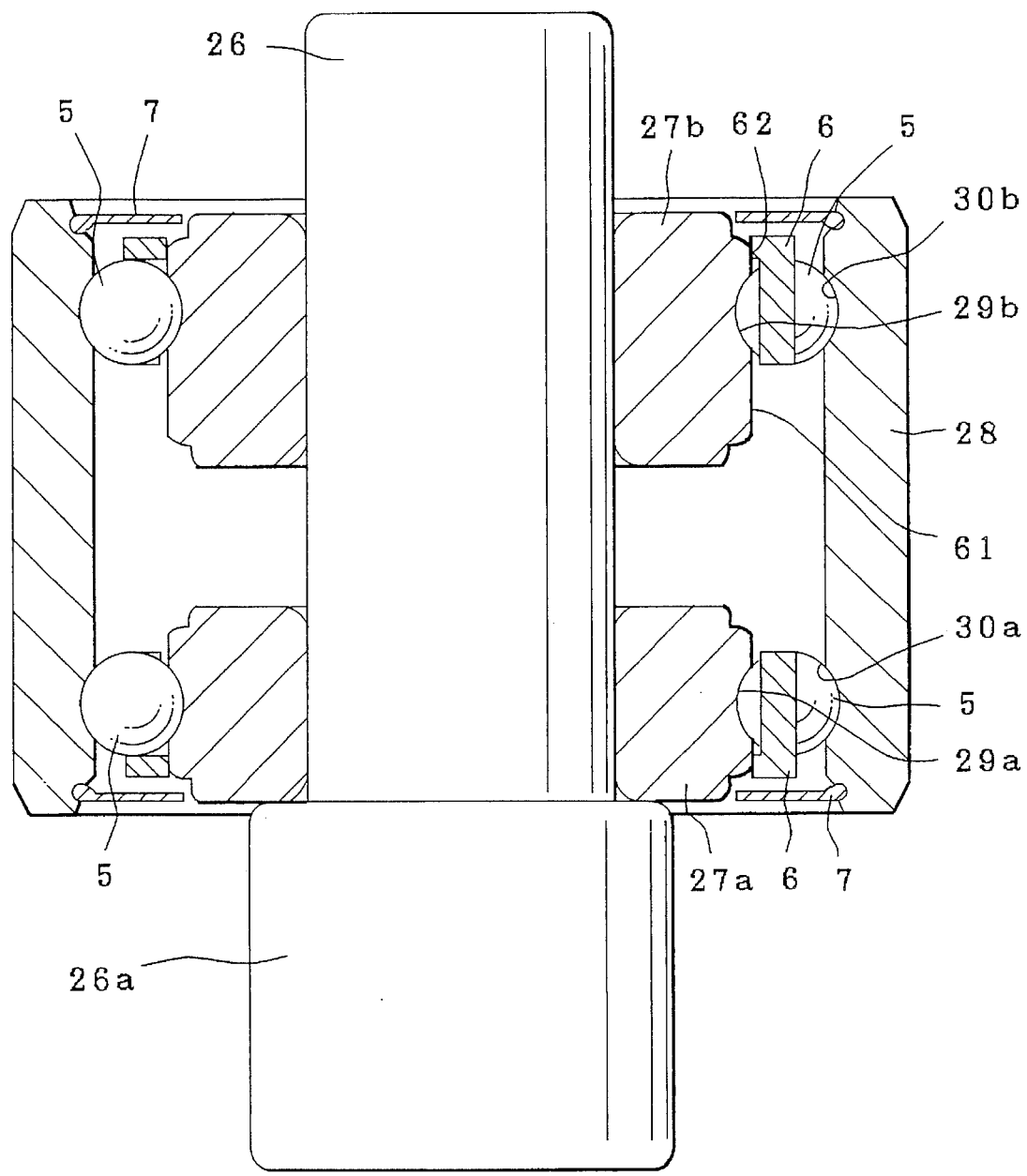
FIG. 16 is a sectional view of a third embodiment of the present invention.

A third embodiment according to the present invention is shown in FIG. 16. With this embodiment, one end of the shaft 26 (lower end in FIG. 16) is formed with a larger diameter portion 26a so that an end face thereof is abutted against an end face of the inner ring 27a. The inner ring 27a thus makes up the first member together with the shaft 26a. Consequently, there is no longer the requirement to maintain engaging strength or fitting strength between the inner ring 27a and the shaft 26 in order to maintain preload. Hence with this embodiment, the axial length of the inner ring 27a can be made shorter, with the first inner raceway (first raceway) 29a formed centrally on the outer peripheral surface thereof.

However the second inner raceway 29b is formed on the outer peripheral face of the inner ring 27b (third member) at a location displaced in the axial direction from a central portion thereof so that the second cylindrical portion 62 which axially protrudes by a relatively small amount from the second inner raceway 29b, is positioned on an axially outer side of the bearing unit. Other details of construction and operation are substantially the same as for the second embodiment.

Figure 17:
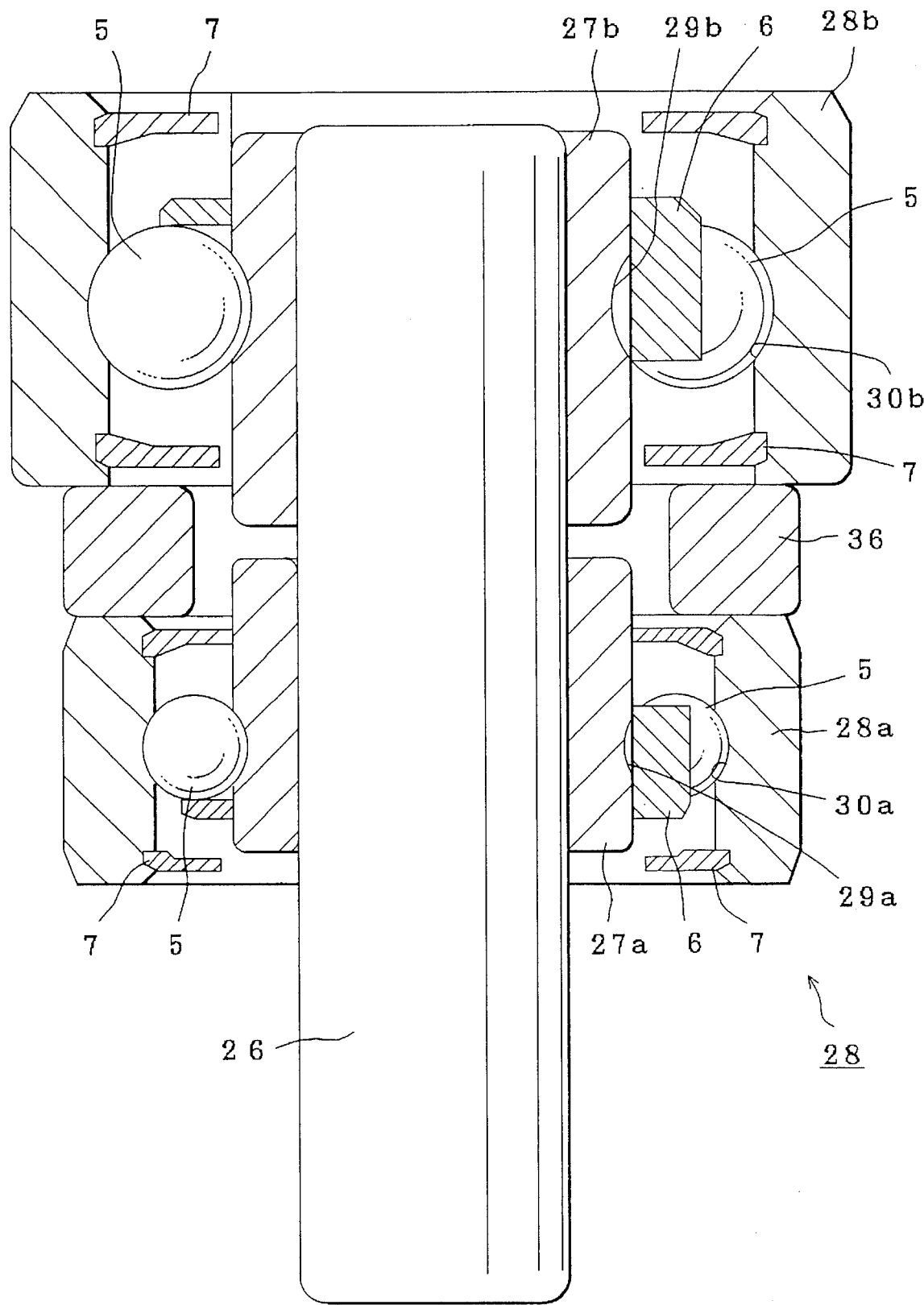
FIG. 17 is a sectional view of a fourth embodiment of the present invention.

A fourth embodiment according to the present invention is shown in FIG. 17. With this embodiment, the outer ring (second member) 28 is not a single unit but is comprised of a pair of ring members 28a, 28b having different diameters with a spacer 36 inserted therebetween. As a result, the diameter of the balls 5 of the double rows can be made different. Other details of construction and operation are substantially the same as for the first embodiment.

Figure 18:
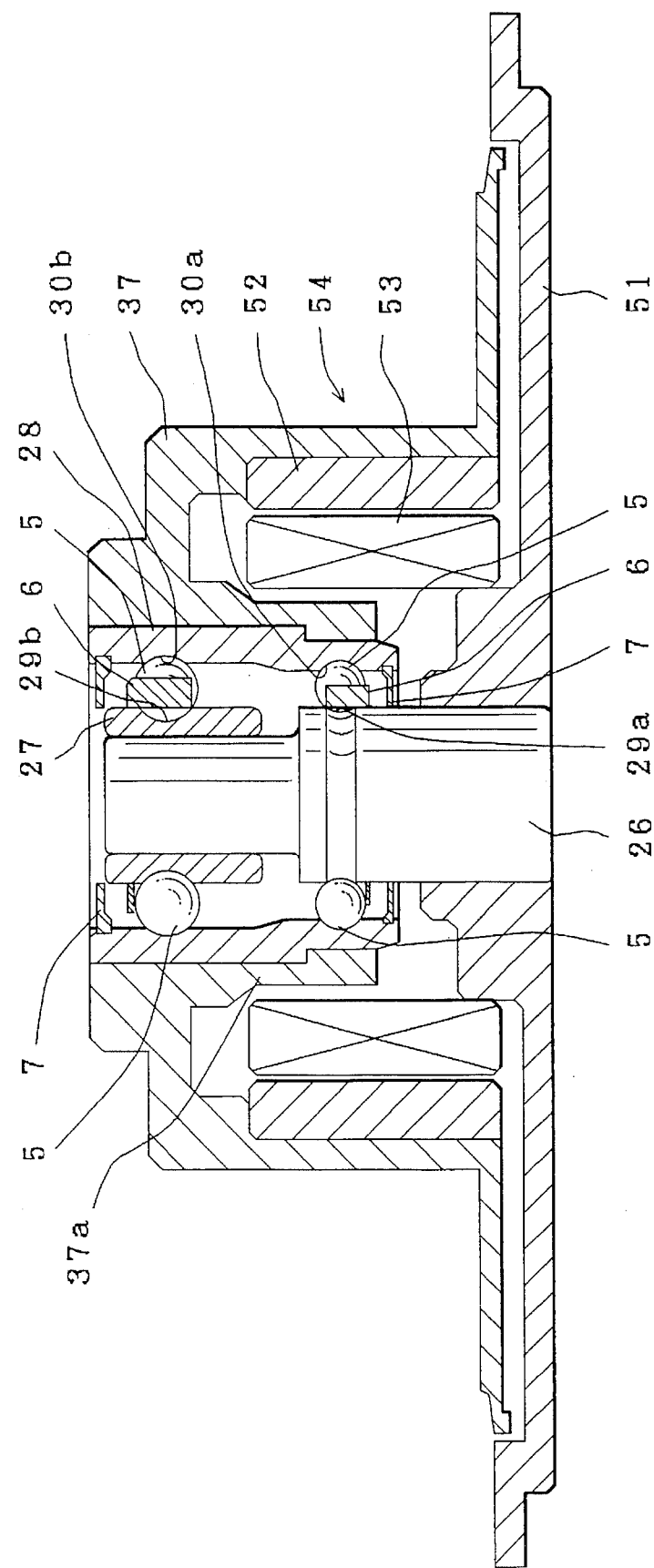
FIG. 18 is a sectional view of a fifth embodiment of the present invention in a first assembling step.

A fifth embodiment according to the present invention is shown in FIG. 18. With this embodiment, as with the previous constructions of FIGS 8(A) through 9(E), a first inner raceway 29a is formed directly onto the outer peripheral face of a shaft (first member) 26. A second inner raceway 29b is formed on the inner ring 27. The diameter of an outer ring 28 is changed partway along so that the diameter of the balls 5 in the double rows can be made different. A hub 37 is press fitted onto the outer ring 28, so that a rotor 52 fixed to an inner peripheral face of the hub 37 makes up an electric motor 54 together with a stator 53 fixed to a housing 51. Other details of construction and operation are substantially the same as for the third embodiment.

With the abovementioned embodiments, the description has been in relation to the third member being the inner ring. However, the invention is also applicable to cases where the third member is a sub outer ring 21, 21a as shown in FIG. 10(A) to FIG. 11(B). That is to say, by displacing the locations where the first and second outer raceways 23, 24 are formed on the inner peripheral faces of the respective sub outer rings 21, 21a in the axial direction from a central portion, the spacing between the raceways can be maintained while keeping the engaging strength or fitting strength between the sub outer rings 21, 21a and the main outer ring 20. Such a construction is of course also within the scope of the present invention.

Figure 19A:
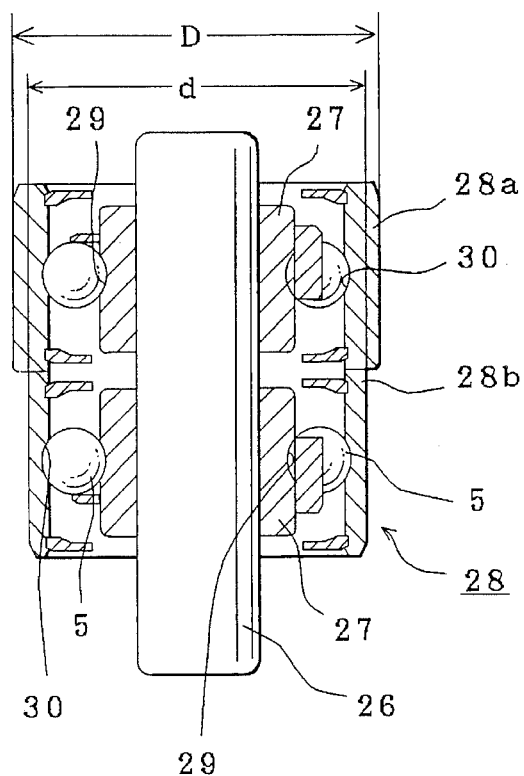
FIG. 19(A) is a sectional view of a sixth embodiment of the present invention in a first assembling step.
Figure 19B:
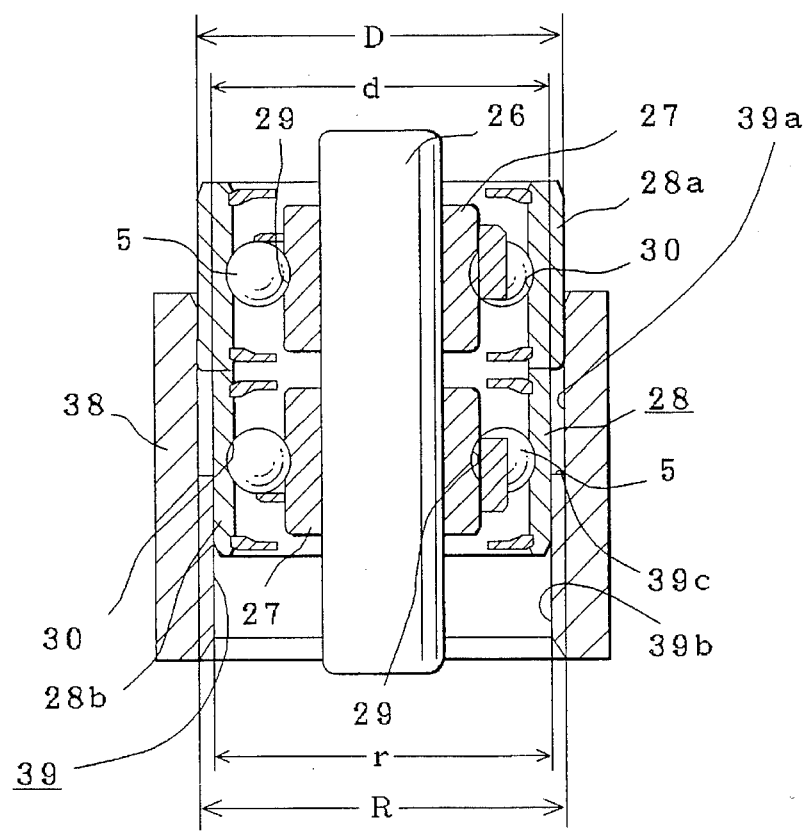
FIG. 19(B) is a sectional view of a sixth embodiment of the present invention in a second assembling step.
Figure 19C:
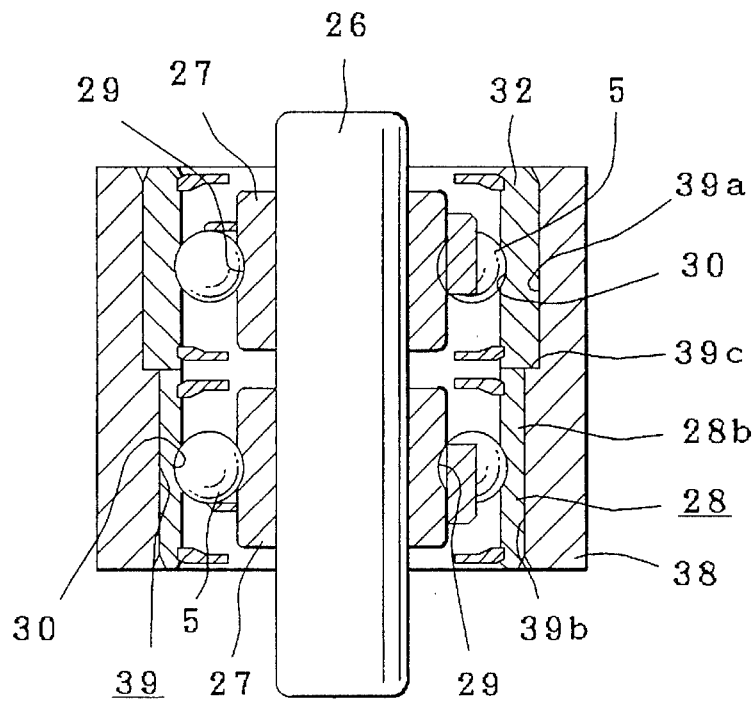
FIG. 19(C) is a sectional view of a sixth embodiment of the present invention in a third assembling step.

FIG. 19(A) to FIG. 19(C) show another embodiment of the present invention.

FIG. 19(A) shows a construction corresponding to the preloaded, double row rolling bearing unit as disclosed in KOKAI No. 6-221326. The outer ring (second member) 28 comprises a first outer ring portion 28a corresponding to the first portion and a second outer ring portion 28b corresponding to the second portion with one end face of the first outer ring portion 28a abutted to one end face of the second outer ring portion 28b, and a double row of outer raceways (second and third raceways) 30 are formed on the inner peripheral faces of the first and second outer ring portions 28a, 28b.

A pair of inner rings 27 is fitted onto the outer peripheral face of the shaft 26. The shaft 26 and one of the inner rings 27 correspond to the first member, while the other inner ring 27 does to the third member. In addition, the inner raceway 29 formed on the outer peripheral face of the one of the inner rings 27 corresponds to the first raceway, and the inner raceway on the outer inner ring 27 to the fourth raceway.

Disposed between the outer raceways 30 and the inner raceways 29 are a plurality of balls 5 which are freely rotatable. The balls are preloaded properly by adjusting the pitch of the inner raceways 29. Detailed description on the steps of preloading is given in KOKAI No. 6-221326.

In the case of the present embodiment, the first outer ring portion 28a has an outer diameter D which is larger than the outer diameter d of the second outer ring portion 28b (D>d).

FIG. 19(B) and FIG. 19(C) show the double row, rolling bearing unit in the present embodiment fitted into the cylindrical housing 38 with the first and second outer ring portions 28a, 28b fixed on the inside of the housing 38.

The inner peripheral surface of the housing 38 defines a support hole 39 to securely fix the first and second outer ring portions 28a, 28b.

The support hole 39 comprises a larger diameter section 39a and a smaller diameter section 39b connected by the step portion 39c.

In the state where the housing 38 and the first and second outer ring portions 28a, 28b all are free, that is not elastically deformed, the inner diameter R of the larger diameter section 39a is slightly smaller than the outer diameter D of the first outer ring portion 28a (R<D), while the inner diameter r of the smaller diameter section 39b is slightly smaller than the outer diameter d of the second outer ring portion 28b.

When the double row, rolling bearing unit of the present embodiment is fitted into the housing 38 with the support hole 39, the second outer ring portion 28b is first inserted at the opening of the larger diameter section 39a into the support hole 39. In the initial stage of inserting operation, where the second outer ring portion 28b is positioned inside the larger diameter section 39a, there is no friction engagement between the outer peripheral face of the first and second outer ring portions 28a, 28b and the inner peripheral face of the support hole 39. Consequently, the outer ring 28 can be instantly inserted into the housing 38 with minimum energy.

Next, in FIG. 19(B), the second outer ring portion 28b is fitted into the smaller diameter section 39b with the first outer ring portion 32 into the outer diameter section 39a. Then, the outer end face of the first outer ring portion 28a is pushed resulting in that the inner end face of the first outer ring portion 28a is abutted to the step portion 39c, so that the preloaded, double row rolling bearing unit is fitted into the housing 38. Since the distance where the inner peripheral face of the support hole 39 comes into friction contact with the outer peripheral face of the outer ring 28 is shortened during the inserting operation, the outer ring 28 can be instantly inserted into the support hole 39 with minimum energy. The inner peripheral face of the support hole 39 and the outer peripheral face of the outer ring 28 hardly experience any scuffing or other damages.

Figure 20:
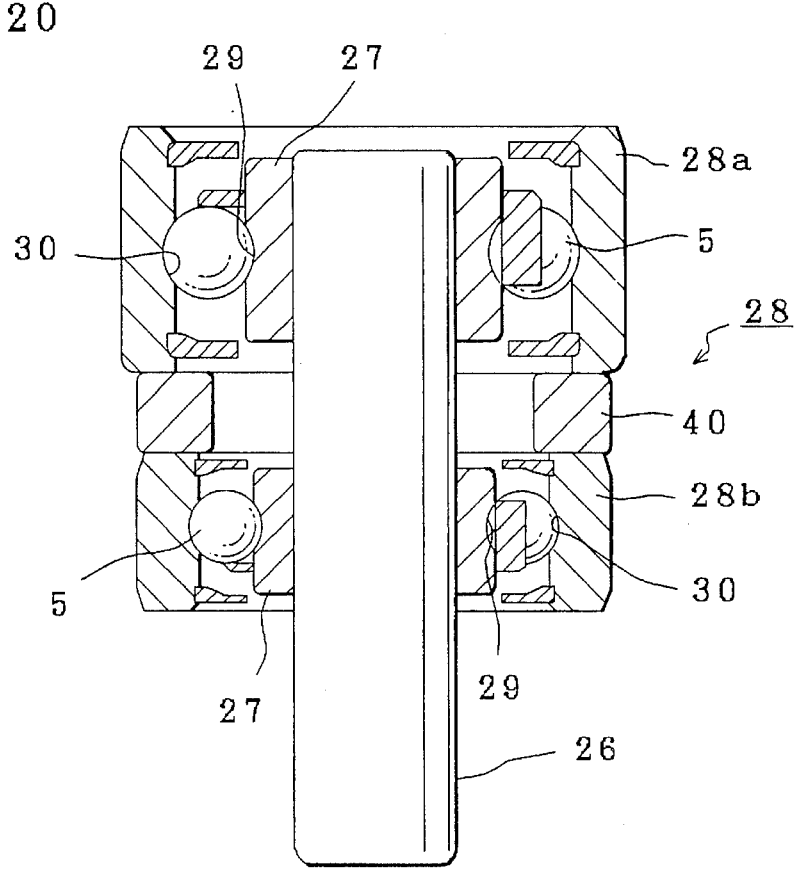
FIG. 20 is a sectional view of another embodiment of the present invention.

FIG. 20 shows another embodiment of the present invention. There is an annular spacer 40 sandwiched between the opposed end faces of the first and second outer ring portion 28a, 28b. The other construction and its operation are substantially the same as those of the embodiment in FIGS. 19(A) to (C).

Figure 21:
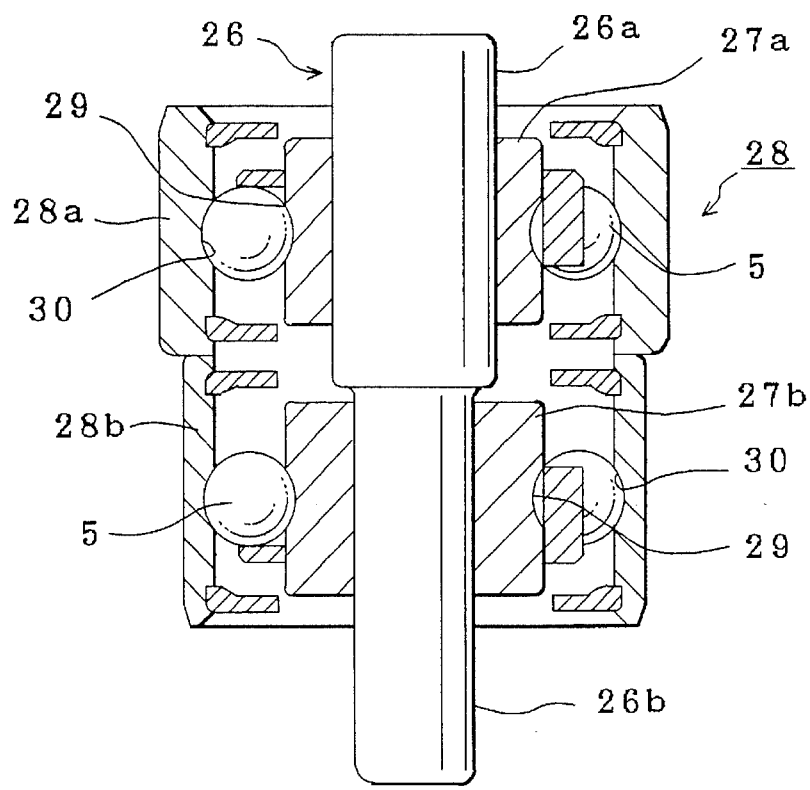
FIG. 21 is a sectional view of another embodiment of the present invention.

FIG. 21 shows another embodiment of the present invention, which is improved in that the outer ring 28 comprising first and second outer ring portions 28a, 28b can be easily inserted into the housing 38, while the inner ring 27a, 27b can be easily fitted onto the outer peripheral face of the shaft 26.

Specifically, the inner peripheral face of the inner ring 27a has a relatively larger diameter, while the inner peripheral face of the inner ring 27b has a relatively smaller diameter. The inner ring 27a is securely fitted onto the larger diameter section 26a with the inner ring 27b onto the smaller diameter section 26b.

Figure 22:
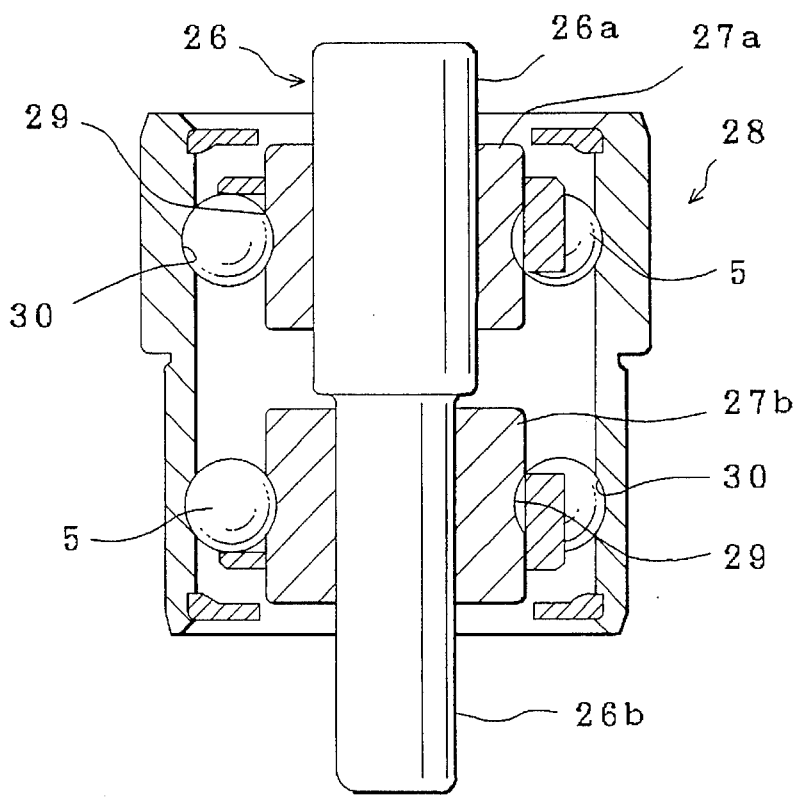
FIG. 22 is a sectional view of another embodiment of the present invention.

FIG. 22 shows another embodiment of the present invention. A single outer ring 28 is used so that its outer diameter changes part-way in the axial direction.

Figure 23:
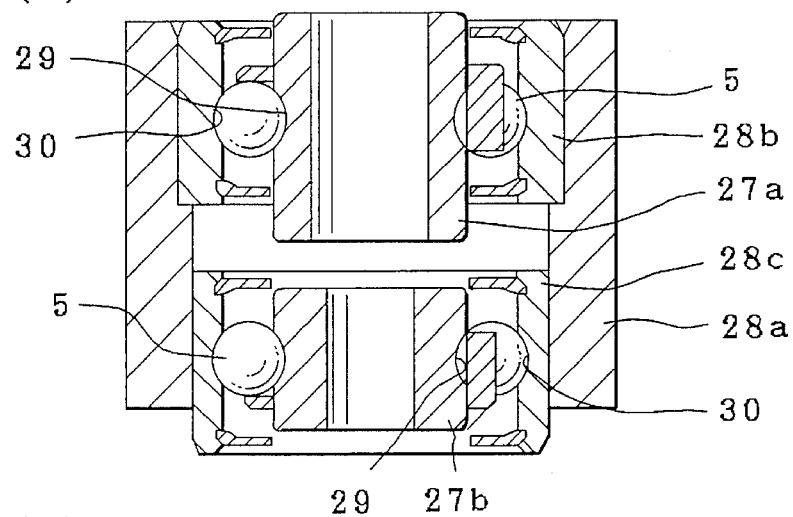
FIG. 23(A) to FIG. 23(C) are a sectional view of another assembling steps of the bearing unit of the present invention.
Figure 23:
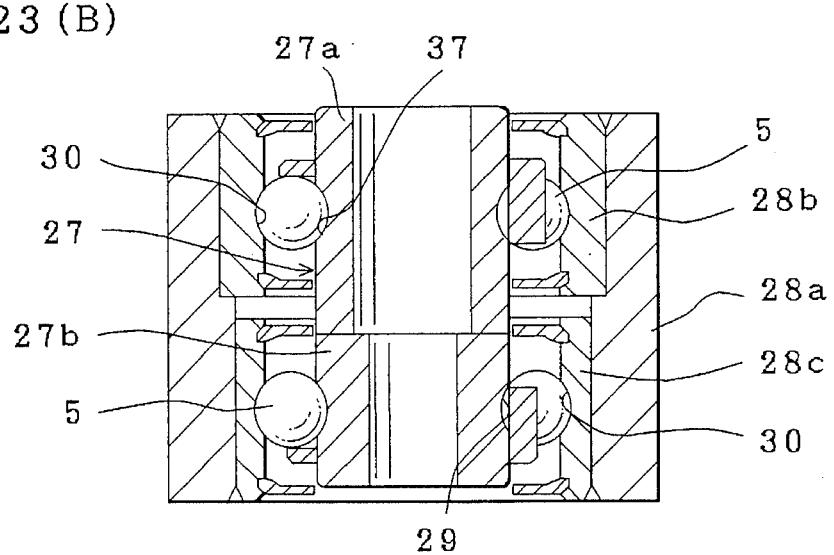
Figure 23:
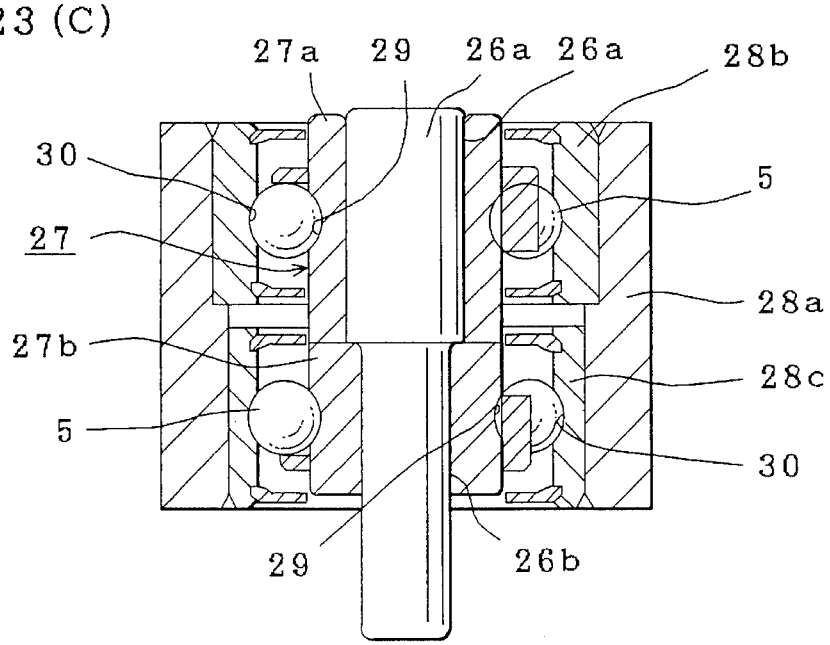

FIG. 23(A) to FIG. 23(C) show another embodiment of the present invention.

Different from the embodiment of FIG. 19 to FIG. 22 the inner ring 27 comprising first and second inner ring portions 27a, 27b with their end faces abutted to each other correspond to the second member, while the main outer spring 28a and the first sub outer ring 28b previously fitted into the main outer ring 28a correspond to the first member. The second sub outer ring 28c secured to the main outer ring 28a corresponds to the third member.

A plurality of balls 5 are provided between the outer raceways 30 and the inner raceways 29 and preloaded by controlling the engagement depth of the second sub outer ring 28c with reference to the main outer ring 28a as detailed in KOKAI No. 6-221326.

It will be noted that the inner diameters of the first second inner ring portions 27a, 27b are changed part-way. Accordingly, the inner ring 27 comprised of the inner ring portions 27a, 27b can be easily and instantly fitted onto the shaft 26.

If it is necessary to make the main outer ring 28a securely fitted into another member such as the housing; the main outer ring 28*a* may have an outer diameter which is changed part-way for easy fitting operation.

Figure 24:
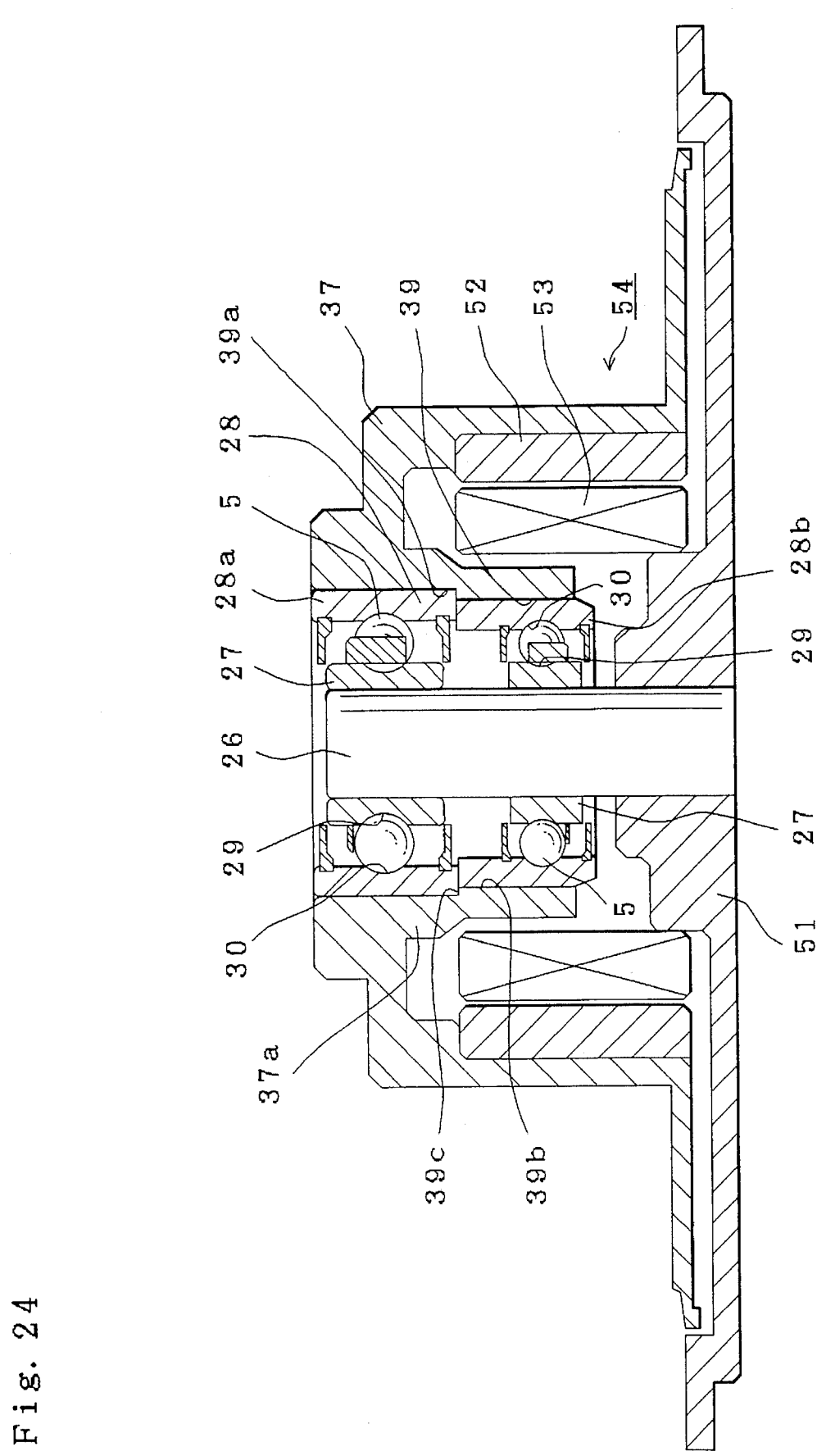
FIG. 24 is a sectional view of another embodiment of the present invention.

FIG. 24 shows another embodiment of the present invention which is installed into an electric motor for the HDD. The mount housing 37*a* into which the outer ring 28 fitted is secured in the radially central portion of the hub 37. The shaft 26 is secured to the radially central portion of the motor housing 51. The rotor 52 secured to the hub 37 has the inner peripheral face opposed to the outer peripheral face of the stator 53 fixed to the motor housing 51 thereby forming an electric motor 54.

Figure 25:
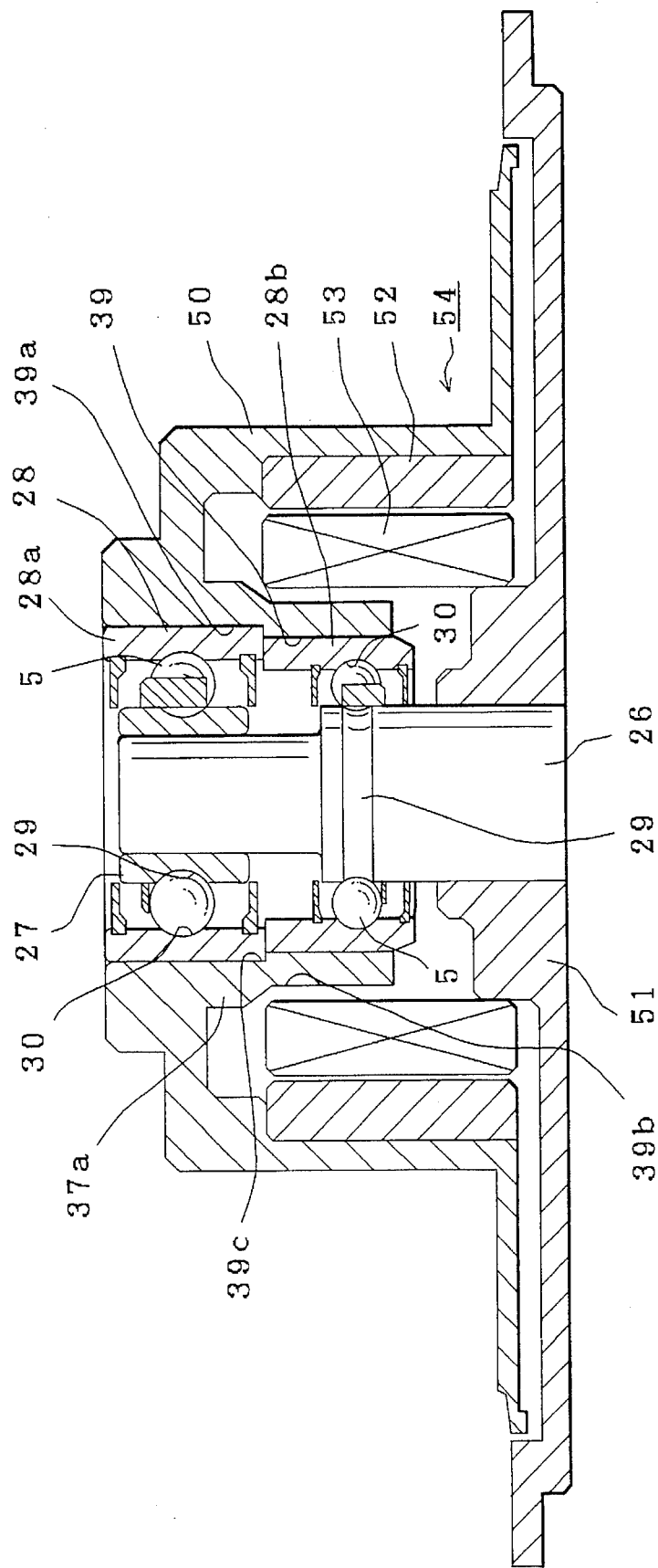
FIG. 25 is a sectional view of another embodiment of the present invention.

FIG. 25 shows another embodiment of the present invention. One of the double row, inner raceways 29 is formed directly on the outer peripheral face of the shaft 26*a*. The other components are substantially the same as those on the previous embodiment in FIG. 24.

Figure 26:
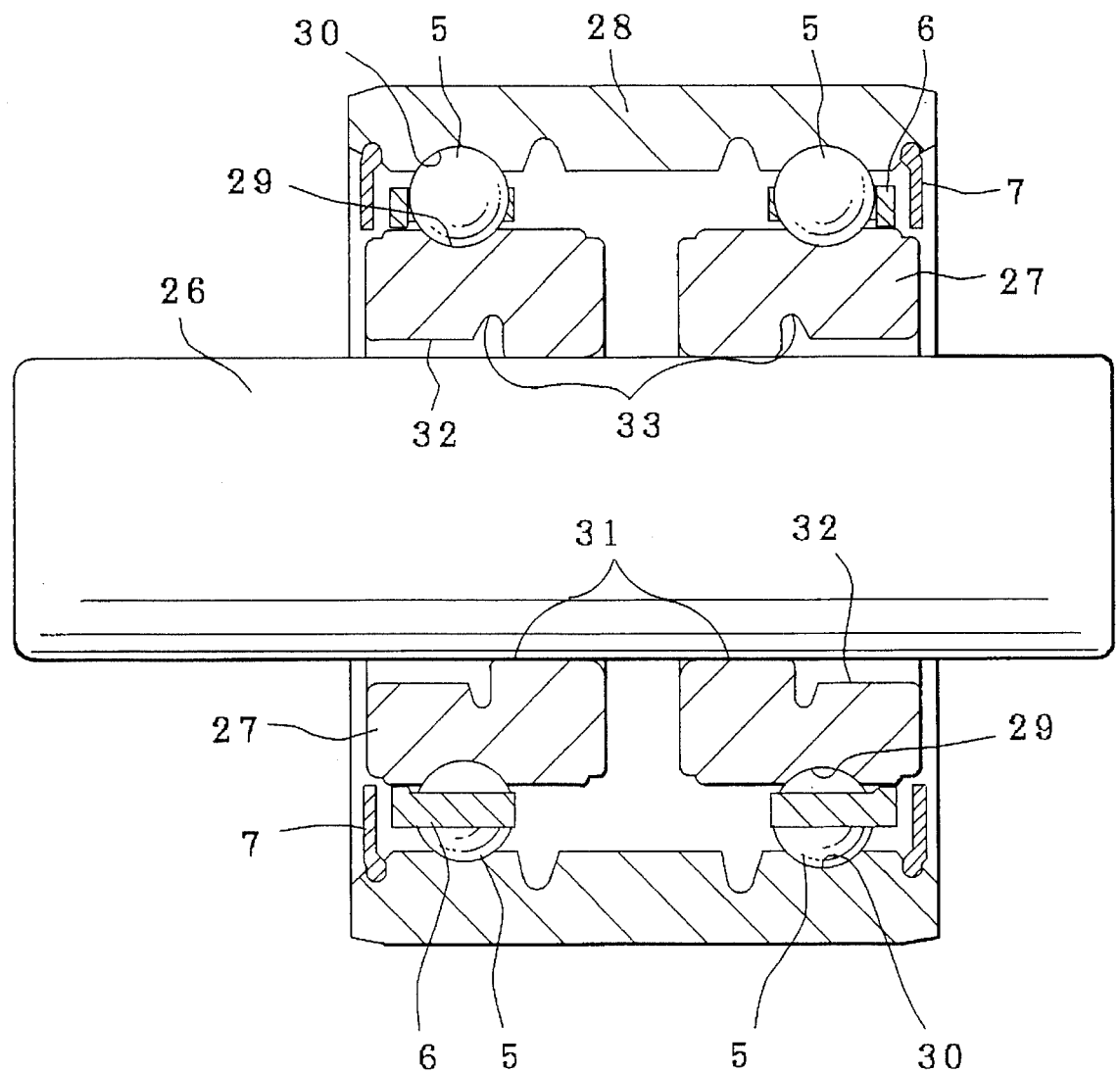
FIG. 26 is a sectional view of another embodiment of the present invention.

FIG. 26 shows another embodiment of the present invention. A pair of inner rings 27 are fitted onto the outer peripheral face of the shaft 26 under a sufficient engaging or fitting strength, so that any movements of the inner rings 27 are prevented due to the counter force based on the preload.

A cylindrical outer ring 28 is provided around the inner rings 27, and concentric with the shaft 26 and inner rings 27.

A single inner raceway 29 is formed on the outer peripheral face of the inner rings 27, respectively, while a groove 33 is formed on the central inner peripheral face (fourth peripheral face) of the inner rings 27, respectively.

Formed on the inside portion of the inner peripheral face of the inner rings 27 is a smaller diameter portion 31, the inner peripheral face of which fitted onto the outer peripheral face of the shaft in an interference fit relationship. Specifically, the inner rings 27 are fitted onto the shaft 26 at the smaller diameter portions 31 under a sufficient engaging or fitting strength.

Formed on the outside portion of the inner peripheral face of the inner rings 27 is a larger diameter portion 32, the inner peripheral face of which never comes into the fitting relationship with the outer peripheral face of the shaft 26. Specifically there is a clearance between the inner peripheral face of the larger diameter portion 32 and the outer peripheral face of the shaft 26 when the inner peripheral face of the smaller diameter portions 31 are brought into an interference fit relation with the outer peripheral face of the shaft 26. The inner raceways 29 are formed around the larger diameter portions 32.

With the construction of the inner rings 27 as mentioned above, even if the outer peripheral face of the shaft 26 onto which the inner rings 27 are fitted has an insufficient roundness, or the inner rings 27 are fitted onto the shaft 26 with excessive interference, so that the fitting portion, that is the smaller diameter portions 31 of the inner rings 27 are deformed, it will never affect the inner raceways 29. Thus the double row, ball bearing with the bearing unit incorporated has a high rotational precision.

After positioning the balls between the inner and outer raceways 29, 30 with the pitch of the inner raceways 29 made slightly larger, at least one of the inner rings 27 is axially displaced to preload the balls. These operations except for preventing deformation of the inner raceways 29 are substantially the same as those in KOKAI No. 6-221326. It will be noted that the present embodiment is a modification of the construction as shown in FIGS. 12(A) and 12(B).

Figure 27:
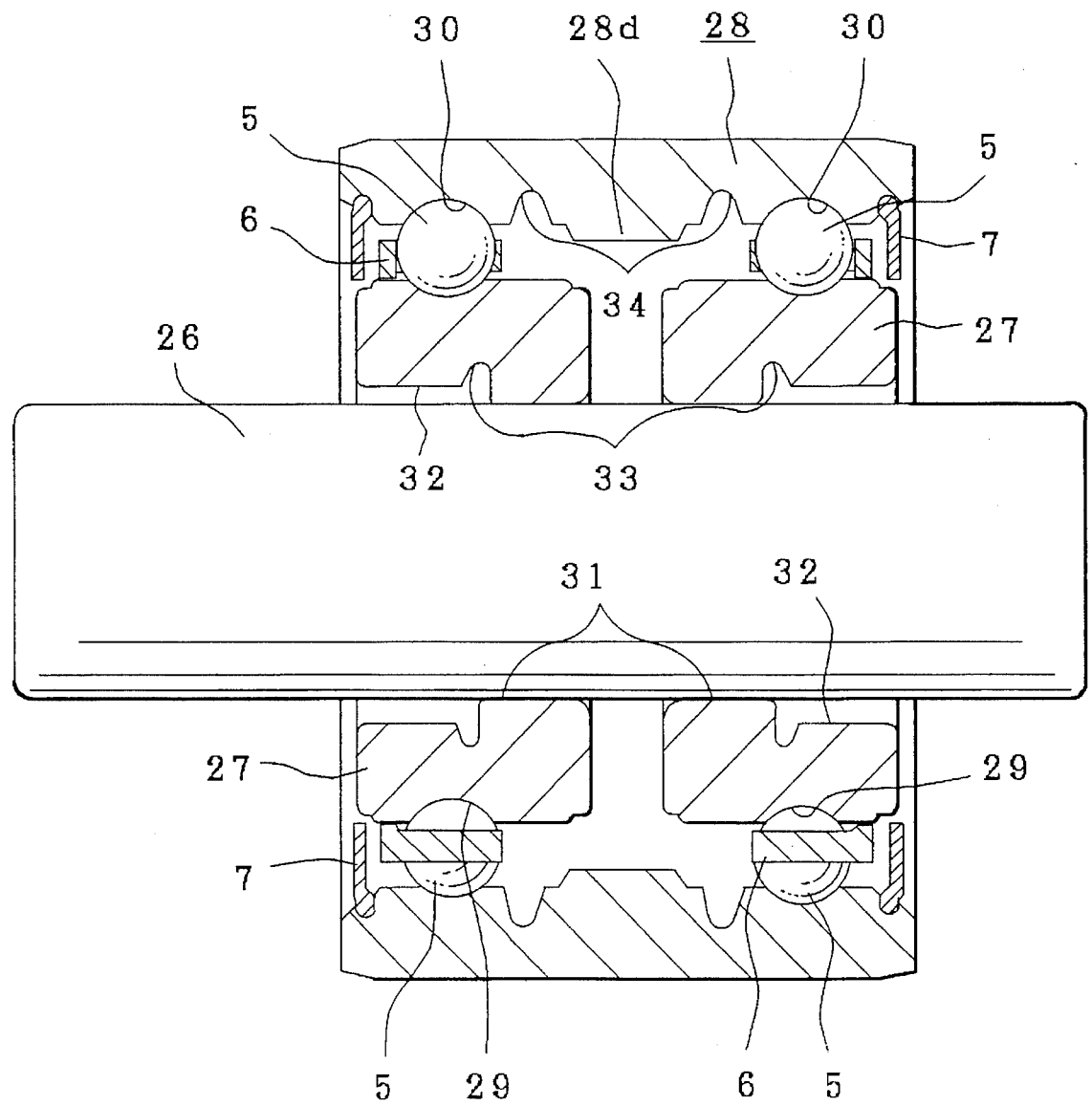
FIG. 27 is a sectional view of another embodiment of the present invention.

FIG. 27 shows another embodiment of the present invention. The outer raceways 30 formed on the inner peripheral face of the outer ring 28 can be prevented from being deformed upon inserting the outer ring 28 into another member such as housing for an interference relationship. The outer raceways 30 are formed at two axially spaced locations on the inner peripheral face of the outer ring 28 respectively. In addition, a pair of grooves 34 axially spaced apart from each other are formed generally along the inner peripheral face of the outer ring 28 at the portion between the double row, outer raceways 30.

When fitting the outer ring 28 into another member such as housing, rotary hub and so on for fixing so as to form a rotary support section of spindle for the HDD, or VTR, the outer ring 28 is fitted at the portion 28*d* between the grooves 34 into the another member. Accordingly, there is a clearance, although small, between the outer peripheral face of the outer ring 28 on the both axial end portions and the inner peripheral face of the another member.

In order to control the fitting location as mentioned above, the outer diameter of the outer ring 28 may be made slightly larger at the portion 28*d* than at the both axial end portions, or the portion of the inner peripheral face of the another member fitted with the portion 28*d* may have an inner diameter slightly smaller than that in another portions.

With the reduced inner diameter in the another member in the another member, the outer raceway 30 may be elastically deformed when passing through the reduced inner diameter portion, but will be restored after passing through the portion.

The rigidity of the outer ring 28 may be lowered at the portion where the pair of grooves 34 are formed. Accordingly, even when the portion 28*d* between the grooves 34 is deformed a little due to the fitting with the housing etc., this deformation hardly reaches the portions of the outer raceways 30 beyond the grooves 34. Therefore, the outer raceways 30 are hardly deformed, and therefore the rotational precision of the double row, ball bearing with the outer ring 28 incorporated can be kept. In the construction of FIG. 27, the portion 28*d* between the grooves 34 is made thicker to increase the rigidity, so that this portion is hardly deformed, thereby presenting the outer raceways 30 from being deformed.

Figure 28:
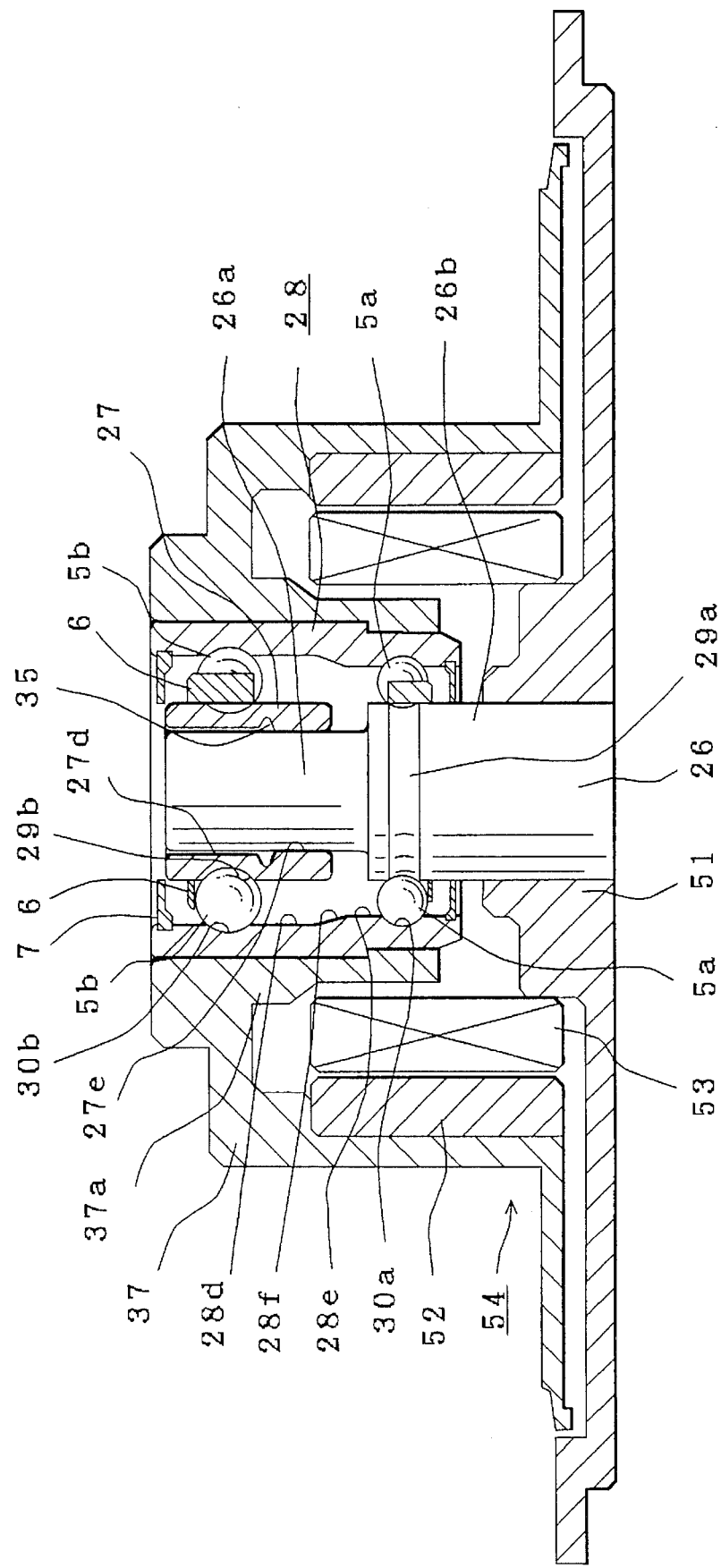
FIG. 28 is a sectional view of another embodiment of the present invention.

FIG. 28 shows another embodiment of the present invention, which is applied to a double row, rolling bearing unit incorporated in the electric motor for the HDD.

Fitted into and secured to the central portion of the housing 51 is a base portion of the shaft 26 which has a smaller diameter portion 26*a* engaged with the inner ring 27 in a fitting relationship for fixing. The inner peripheral face of the inner ring 27 is comprised of a smaller diameter portion 31 and a larger diameter portion 27*d* with a groove 35 between them. The smaller diameter portion 27*e* of the inner ring 27 is fitted onto the smaller diameter portion 26*a* of the shaft 26.

The outer ring 28 is provided around the shaft 26 and the inner ring 27, and concentric with the shaft 26 and the inner ring 27. The inner peripheral face of the outer ring 28 comprises a larger diameter portion 28*d* around the inner ring 27 and a smaller diameter portion 28*e* around the larger diameter portion 26*b* of the shaft 26 with a tapered portion 28*f* between them. A plurality of smaller balls 5*a* are provided between the inner raceway 29*a* on the outer peripheral face of the larger diameter portion 26*b* of the shaft 26 and the outer raceway 30*a* on the smaller diameter portion 28*e* of the outer ring 28, while a plurality of larger balls 5*a* are provided between the inner raceway 29*b* on the outer peripheral face of the inner ring 27 and the outer raceway 30*b* on the larger diameter portion 28*d* of the outer ring 28.

The outer ring 28 is securely fitted into the cylindrical support portion 37a formed in the central portion of the hub 37 to support a hard disc. The inner peripheral face of the cylindrical support portion 37a is comprised of a larger diameter portion and a smaller diameter portion with a step portion between them, corresponding to the outer profile of the outer ring 28. Such constructions will prevent the mating peripheral faces from being slid generally along their length during the fitting operation.

The rotor 52 is fixed to the inner peripheral face of the hub 37, and the stator 53 is fixed to the housing 51 and opposed to the inner peripheral face of the rotor 52, thus forming an electric motor 54 for rotating the hub 37.

Figure 29:
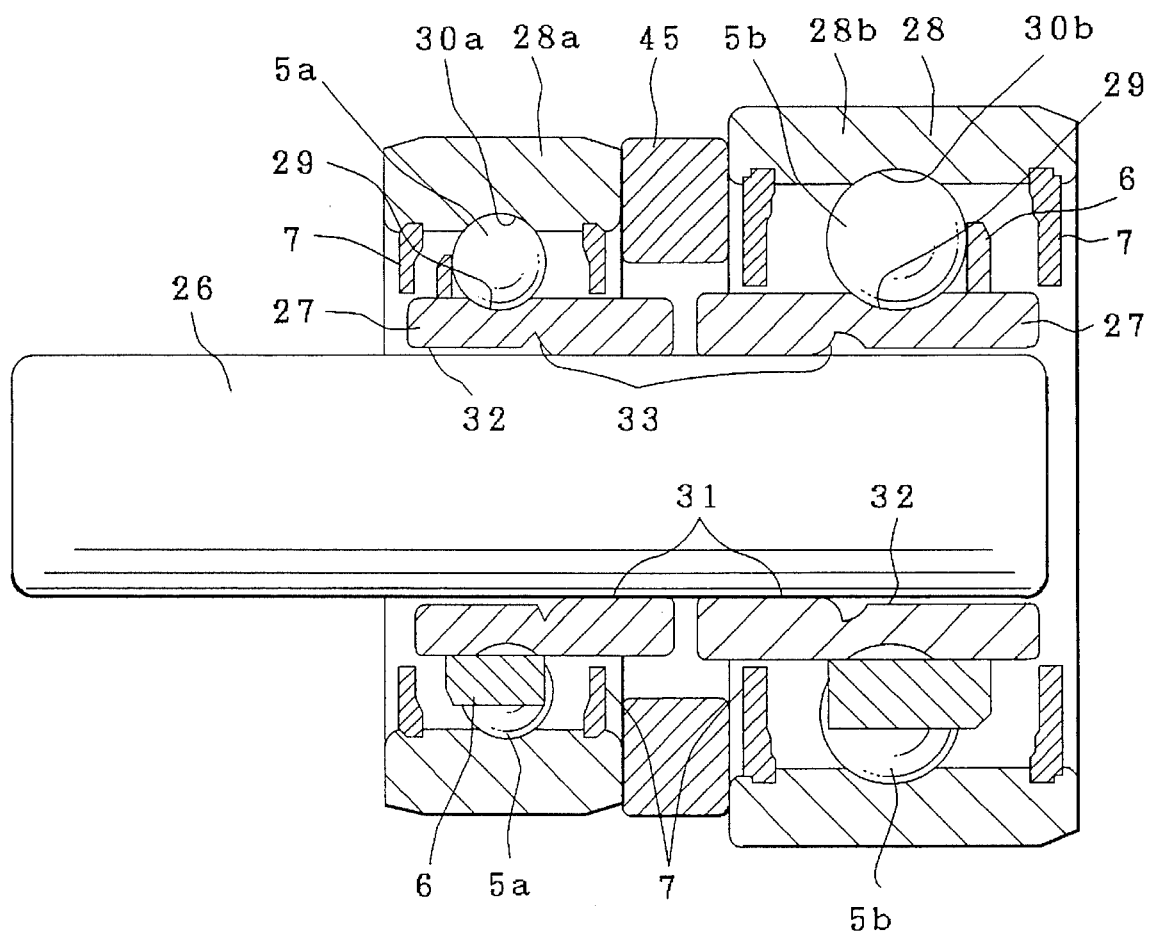
FIG. 29 is a sectional view of another embodiment of the present invention.

FIG. 29 shows another embodiment of the present invention. An outer ring 28 is comprised of a radially smaller outer ring portion 28a and a radially larger outer ring portion 28b with a spacer 45 axially between them. This outer ring 28 is fitted into the cylindrical support portion 37a (see FIG. 18) of the hub 37.

Figure 30:
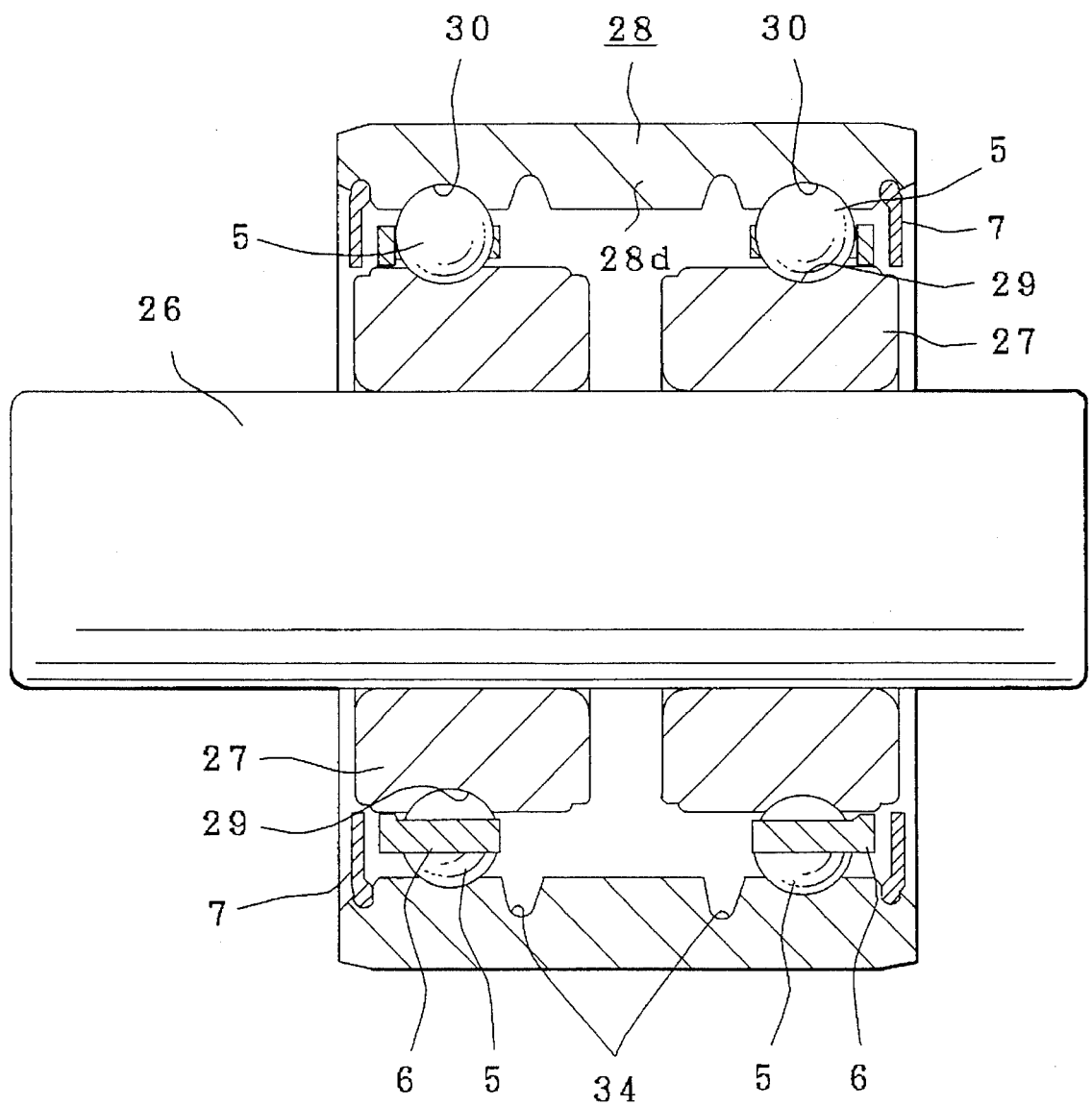
FIG. 30 is a sectional view of another embodiment of the present invention.

FIG. 30 shows another embodiment of the present invention. A pair of inner ring 27 are fitted onto the outer peripheral face of the shaft 26 under a sufficient engaging or fitting strength. A cylindrical outer ring 28 is provided around the inner rings 27 and concentric with the shaft 26 and inner rings 27.

A single inner raceway 29 is formed on the outer peripheral face of the inner rings 27, respectively, while an outer raceway 25 is formed on the inner peripheral face of the outer ring 28 at two axially spaced locations. There are a plurality of balls 5 provided between the inner raceways 29 and the outer raceways 30, respectively. A retainer or cage 6 is used for each ball row to rotatably support the balls 5.

A pair of axially spaced grooves 34 are provided on the inner peripheral face of the outer ring 28 at the portion between the outer raceways 25, and extend generally along the inner peripheral face of the outer ring 28.

When the outer ring 28 is securely fitted into the housing or rotor hub or another member so as to form a rotary support portion for the spindle in the HDD or VTR, the outer ring 28 is fitted into the housing etc. at the portion 28d between the grooves 34. Therefore, there is a clearance, although slight, between the outer peripheral face of the both axial end portions of the outer ring 28 and the inner peripheral face of the housing etc.

In order control the fitting locations as mentioned above, the outer diameter of outer ring 28 may be made larger at the portion 28d than the both axial end portions, or the inner diameter of the inner peripheral face of the housing or another member at the portion fitted with the portion 28d may be made slightly smaller than at the other portions. When this inner diameter of the housing or another member is reduced, the outer raceways 30 may be elastically deformed at the moment where the portion of the outer raceway 30 passes through that portion. However, the outer raceways 30 will be restored after passing.

The rigidity of the outer ring 28 is reduced at the portion where the pair of grooves 34 are formed. Therefore, even where the portion 28d between the grooves 34 is slightly deformed upon fitting with the housing or another member, it will not affect the portions of the outer raceways 30 beyond the grooves 34. Accordingly, the outer raceways 30 are hardly deformed, and the high rotating precision is maintained in the double row, ball bearing unit having this outer ring 28 in it.

When assembling the double row, ball bearing unit, the distance between the pair of inner rings 27 is previously slightly widened before inserting the balls 5 between the outer raceways 30 and the inner raceways 29. After placing the balls at the predetermined locations, the distance between the inner rings 27 is reduced to apply a preload to the balls 5.

Figure 31:
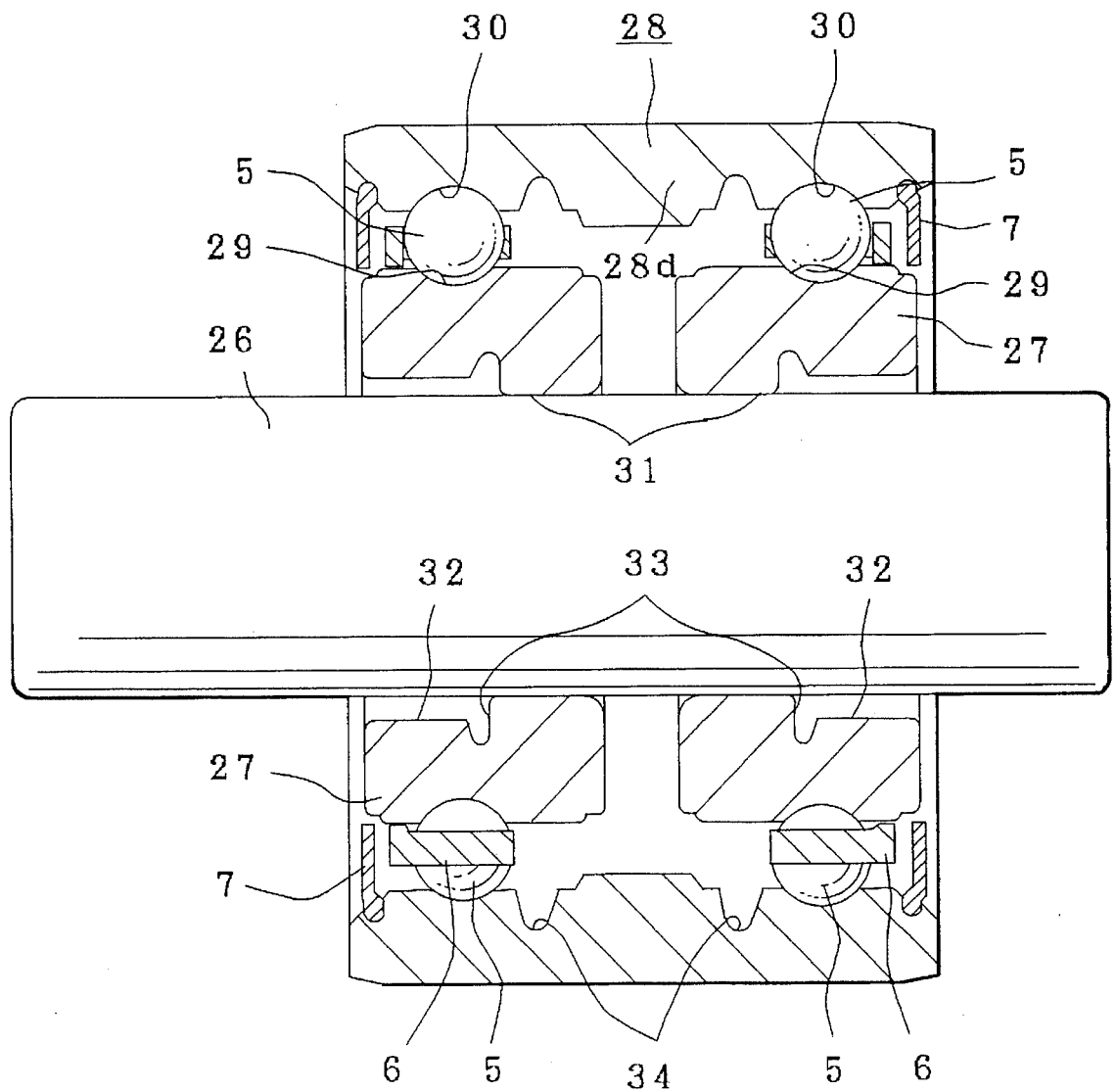
FIG. 31 is a sectional view of another embodiment of the present invention.

FIG. 31 shows another embodiment of the present invention. In order to prevent the inner raceways 29 from being deformed upon inserting the shaft 26 into the inner ring 27 with the inner raceways 29 and to prevent the outer raceways 30 from being deformed upon inserting the bearing unit into the housing or another member, grooves 33 are formed generally along the inner peripheral face of the central portion of the inner rings 27. On one side of each of the groove 33, a smaller diameter portion 31 is provided while on the other side of each of the grooves 33, a larger diameter portion 32 is provided, so that each of the inner rings 27 is securely fitted onto the shaft 26 at the smaller diameter portion 31. In this condition, there is a clearance between the inner peripheral face of the larger diameter portion 32 and the outer peripheral face of the shaft 26. The inner raceways 29 on the outer peripheral face of the inner rings 27 are formed around the larger diameter portions 32.

Due to the above described construction of the preloaded rolling bearing units according to the present invention, a compact rolling bearing unit of high anti-bending-moment rigidity can be obtained while still ensuring a similar effect to that of the beforementioned previous inventions in Japanese Patent First Publication No. KOKAI 6-221326.

The terms "inner raceway" and "outer raceway" are used in this specification, but they are also referred to as "inner ring raceway" and "outer ring raceway", respectively.

What is claimed is:

1. A preloaded rolling bearing unit comprised of; a first member having a first peripheral face, a second member located concentric with the first member with a second peripheral face opposite to the first peripheral face, a first raceway formed on the first peripheral face, a second raceway formed on a portion of the second peripheral face which is opposite to the first raceway, and a third raceway formed on a portion of the second peripheral face which is displaced in the axial direction from the second raceway, a third member supported on the first member with sufficient engaging strength, concentric with the first and second members and having a third peripheral face opposite to the second peripheral face, a fourth raceway formed on a portion of the third peripheral face which is opposite to the third raceway, and a plurality of balls provided respectively between the first and second raceways and between the third raceway and fourth raceways, such that an appropriate preload is applied to the plurality of balls by adjusting an engaging or fitting depth of the third member with respect to the first member, the fourth raceway formed on the third peripheral face at a location displaced in an axial direction from a central portion of the third member, so that a first cylindrical portion is formed on the third member to axially protrude by a relatively large amount from one side of the fourth raceway, while a second cylindrical portion is formed on the third member to axially protrude by a relatively small amount from the other side of the fourth raceway, and that the first cylindrical portion is positioned on an axially inner side of the bearing unit and the second cylindrical portion is positioned on an axially outer side of the bearing unit.

\* \* \* \* \*